United States Patent
Ross, Jr.

(10) Patent No.: US 12,282,307 B1
(45) Date of Patent: Apr. 22, 2025

(54) COMMUNICATION-ENABLED POWER MANAGEMENT SYSTEMS

(71) Applicant: Ross Bros. Construction, LLC, Chicago, IL (US)

(72) Inventor: Bruce Eliot Ross, Jr., Chicago, IL (US)

(*) Notice: Subject to any disclaimer, the term of this patent is extended or adjusted under 35 U.S.C. 154(b) by 0 days.

(21) Appl. No.: 18/935,187

(22) Filed: Nov. 1, 2024

(51) Int. Cl.
*G05B 19/042* (2006.01)
*G08C 17/02* (2006.01)

(52) U.S. Cl.
CPC ......... *G05B 19/0428* (2013.01); *G08C 17/02* (2013.01); *G05B 2219/2642* (2013.01); *G08C 2201/12* (2013.01); *G08C 2201/30* (2013.01)

(58) Field of Classification Search
CPC ........ G05B 19/0428; G05B 2219/2642; G08C 17/02; G08C 2201/12; G08C 2201/30
See application file for complete search history.

(56) References Cited

U.S. PATENT DOCUMENTS

| | | | |
|---|---|---|---|
| 10,557,876 B2 | 2/2020 | Frader-Thompson et al. | |
| 2005/0001486 A1 | 1/2005 | Schripsema et al. | |
| 2011/0106996 A1* | 5/2011 | Rosso | G06F 13/409 710/110 |
| 2012/0086272 A1 | 4/2012 | Chen et al. | |
| 2012/0086632 A1 | 4/2012 | Lin | |
| 2012/0143539 A1 | 6/2012 | Krause | |
| 2012/0316808 A1* | 12/2012 | Frader-Thompson | G01R 21/00 702/61 |
| 2014/0028466 A1 | 1/2014 | Tsai | |
| 2014/0064737 A1 | 3/2014 | Chen et al. | |
| 2014/0121786 A1 | 5/2014 | Chen et al. | |
| 2020/0280771 A1 | 9/2020 | Hoang et al. | |
| 2020/0341529 A1* | 10/2020 | Kaipu Narahari | G05B 15/02 |

FOREIGN PATENT DOCUMENTS

| | | |
|---|---|---|
| CN | 203674487 U | 6/2014 |
| CN | 104269710 A | 1/2015 |
| CN | 108958095 A | 12/2018 |
| KR | 20150125783 A | 11/2015 |

OTHER PUBLICATIONS

Mrazovac, Bojan & Z. Bjelica, Milan & Teslic, Nikola. (2011). Towards Ubiquitous Smart Outlets for Safety and Energetic Efficiency of Home Electric Appliances. 10.1109/ICCE-Berlin.2011. 6031795, website: https://www.1researchgate.net/publication/215660586_Towards_Ubiquitous_Smart_Outlets_for_Safety_and_Energetic_Efficiency_of_Home_Electric_Appliances.

* cited by examiner

*Primary Examiner* — Mohammad Ali
*Assistant Examiner* — Sheela Rao
(74) *Attorney, Agent, or Firm* — Derek Fahey, Esq.; The Plus IP Firm, PLLC

(57) ABSTRACT

A communication-enabled power management system is disclosed. The system includes a self-contained receptacle outlet comprising a housing, a power receptacle, a power sensor configured to monitor a plurality of power parameters, a motion detection module, a transceiver, and a processor with a unique identifier. The processor connects the receptacle to a remote controller and allows the user to toggle between power states. The system further includes a predictive analytics module to optimize power usage based on occupancy patterns, and an independent power backup management module for maintaining power during failures. The system also communicates with secondary devices, such as vents and switches, to manage energy distribution and respond to emergency events.

19 Claims, 20 Drawing Sheets

COMMUNICATION-ENABLED POWER MANAGEMENT SYSTEMS

REFERENCE TO RELATED APPLICATIONS

Not applicable.

CROSS-REFERENCES

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISK

Not applicable.

TECHNICAL FIELD

The present disclosure relates to the field of electrical power management, and more specifically to the field of communication-enabled power management.

BACKGROUND OF THE INVENTION

In modern residential and commercial environments, managing energy consumption is increasingly important due to the rising costs of electricity and the need for energy efficiency. As more electrical devices are integrated into homes and businesses, there is a growing demand for systems that can intelligently manage power distribution and consumption. Traditional power outlets and switches lack the intelligence needed to monitor, analyze, and control energy usage effectively. They typically provide only basic functionality, such as switching devices on or off, without any insight into the power being consumed or the ability to react to environmental changes.

In particular, conventional outlets and switches are passive components. They do not offer the capability to monitor power parameters such as voltage, current, or energy consumption. Users are left without real-time information on their energy use or the ability to control power remotely. This lack of control and insight often leads to inefficient power usage, with devices remaining on even when not in use or when there is no occupancy in the area.

Another significant limitation in the existing systems is the absence of integrated safety and security features. Current outlets and switches do not have the ability to detect motion, respond to emergency events such as fires or break-ins, or track the real-time location of individuals within a space. As a result, in the event of an emergency, there is no automated system to alert users, adjust connected devices, or take preventative actions such as cutting power or activating safety mechanisms.

Moreover, power failures or fluctuations in electrical supply often leave users without any backup power solution at the outlet level. Traditional systems rely on central backup power systems, which may not be practical or cost-effective for smaller-scale applications. This creates challenges in maintaining the continuity of power supply to critical devices during outages.

Recent advancements in smart home technologies and the Internet of Things (IoT) have introduced some solutions to these issues, but they are often fragmented, requiring multiple devices and platforms that are not well-integrated. There remains a need for a comprehensive, communication-enabled system that can integrate power management, environmental monitoring, and security functions within a single, self-contained device. Such a system would offer users greater control over their energy usage, improve safety, and increase the overall efficiency of electrical systems in residential and commercial settings.

As a result, there exists a need for improvements over the prior art and more particularly for a communication-enabled power management system that integrates intelligent control, monitoring, and emergency response functions into a self-contained receptacle outlet and other compatible devices.

BRIEF SUMMARY OF THE INVENTION

An apparatus, system, and method for communication-enabled power management is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a communication-enabled power management system is disclosed. The outlet comprises a housing, a power receptacle on a front face of the housing, a power sensor configured to monitor a plurality of power parameters, and a transceiver within the housing. The system includes a switching module coupled to the housing that is configured to allow a user to selectively control the flow of electrical power to a connected electrical device by switching between an on-state, where power is provided, and an off-state, where power is not provided. A motion detection module is coupled to the housing and is configured such that if motion is detected in a first predefined area, the system switches the self-contained receptacle outlet to the on-state, and if motion is not detected in the first predefined area, the system switches the self-contained receptacle outlet to the off-state. The system includes an independent power backup management module coupled to the housing that is configured to allow the self-contained receptacle outlet to switch to the on-state if at least one power parameter of the plurality of power parameters fails to satisfy a power parameter threshold. A predictive analytics module is coupled to the housing and is configured to detect when a second predefined area is unoccupied by beings, and if the probability of occupancy in the second predefined area is above an occupancy threshold, the system switches the self-contained receptacle outlet into an energy-saving state.

A display is present on the front face of the housing, and a user interface on the front face of the self-contained receptacle outlet is configured to display at least one power parameter of the plurality of power parameters. A button is located on the front face of the housing to toggle the power parameter displayed on the user interface. The system includes a processor coupled to the housing, which has a unique identifier. The processor is configured to connect the self-contained receptacle outlet to a remote controller using the unique identifier. The processor transmits a second user interface to the remote controller, where the second user interface displays the plurality of power parameters and includes a mode toggle for switching the self-contained receptacle outlet between the on-state, the off-state, and the energy-saving state. The processor is further configured to receive a signal from the remote controller to switch the self-contained receptacle outlet to the on-state, the off-state, and/or the energy-saving state. The processor switches the self-contained receptacle outlet based on the signal received and sends a message to the remote controller when a change in at least one power parameter is detected.

The communication-enabled power management system further comprises a second self-contained device. The second device may be a self-contained vent or a self-contained switch, and each of these second devices comprises a second motion detection module. The system further includes a security component comprising a security component detection module. The motion detection module and the second motion detection module include a plurality of sensors that communicate with both the self-contained receptacle outlet and the second self-contained device. The processor of the self-contained receptacle outlet, or a second processor in the second self-contained device, is configured to analyze a plurality of signals received from the plurality of sensors and determine a subject's location within the first predefined area and/or the second predefined area.

The security component comprises at least one sensor that detects the occurrence of an emergency event. The processor or the second processor analyzes a second plurality of signals from the security component's sensor to determine the relative location of the emergency event within the first predefined area and/or the second predefined area. Upon detecting the emergency event, the processor or second processor compares the relative location of the emergency event to the location of the subject. After comparing the relative location of the emergency event to the subject's location, the processor or second processor generates and sends a message to an emergency computing device and adjusts the state of the self-contained receptacle outlet and/or the second self-contained device. The message sent to the emergency computing device includes a report that contains a visual representation of the first predefined area, the second predefined area, the subject's location, and the relative location of the emergency event.

The second self-contained device may be a self-contained vent that includes a vent frame coupled to an adjustable grille with at least one integrated opening. The vent can move between an open configuration and a closed configuration, and if the security component detects an environmental condition, the second processor changes the vent's state between the open and closed configurations. The self-contained receptacle outlet further comprises a subset power mode defined by a set of input parameters received from the remote controller. The predictive analytics module of the self-contained receptacle outlet uses at least one algorithm, an occupancy pattern, and a historical power usage dataset collected from the power sensor to predict future power consumption and adjust the power state of the outlet based on the subset power mode.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein.

Like reference numerals refer to like parts throughout the various views of the drawings.

DETAILED DESCRIPTION

Figure 1:
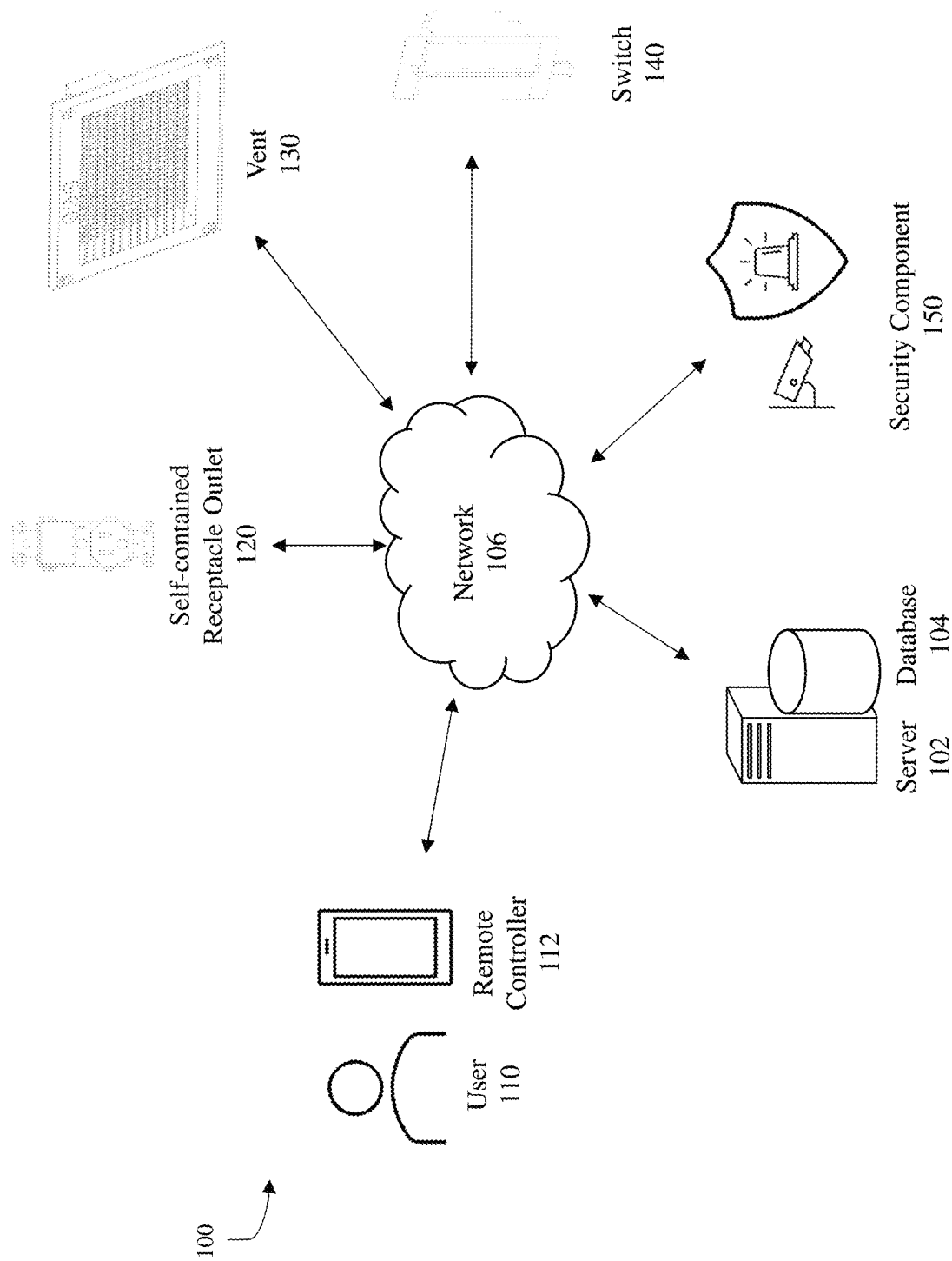
FIG. 1 is a diagram of an operating environment that supports a communication-enabled power management system, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for communication-enabled power management. One important improvement is the integration of power monitoring and control directly within the receptacle outlet. Unlike conventional outlets, which provide basic on/off functionality without insight into power usage, the present system incorporates a power sensor and switching module that allow users to monitor real-time power parameters and selectively control the flow of electricity to connected devices. This provides users with a more granular and efficient approach to managing energy consumption, thereby reducing unnecessary power usage and extending the lifespan of connected devices.

The system also features advanced motion detection and predictive power management capabilities, which surpass the simple motion-based lighting control found in existing systems. While prior systems may turn devices on or off based solely on immediate motion detection, this system employs a predictive analytics module to analyze occupancy patterns and adjust power states accordingly. By predicting when areas will likely be unoccupied, the system can proactively shift devices into energy-saving states, optimizing energy use beyond the reactive capabilities of prior art systems.

Another important enhancement is the inclusion of an independent power backup management module within the outlet itself, which ensures that power can continue to flow to critical devices even in the event of a power failure. Traditional systems often rely on centralized backup power systems that can be expensive and inefficient for smaller-scale applications. In contrast, the present system provides localized backup at the device level, offering a more reliable and cost-effective solution for power continuity.

Additionally, the system offers remote control and communication capabilities that improve upon the cumbersome, fragmented nature of prior smart home setups. By utilizing a transceiver and processor with a unique identifier, the system connects seamlessly to remote controllers, allowing users to monitor and manage power parameters from any location. This level of remote access provides greater convenience and flexibility compared to prior systems that require direct physical interaction or rely on complex, multi-device smart home hubs.

Furthermore, the system's ability to detect and respond to emergency events marks a significant advancement in security and safety management. Through integrated security components and motion sensors, the system can detect emergencies such as fires or break-ins and automatically respond by adjusting power states and notifying emergency services. The system can even compare the relative location of the emergency to the location of individuals within the space, offering a targeted, intelligent response that enhances safety, which are capabilities that are lacking in prior art.

The system also coordinates multiple self-contained devices, such as outlets, vents, and switches, to optimize environmental conditions and energy use. This integrated approach allows the system to manage not only power consumption but also ventilation and temperature control, all while responding to real-time occupancy and environmental data. Such multi-device coordination offers a holistic solution for managing energy efficiency, improving upon systems that focus solely on individual device control without broader environmental optimization.

Referring now to the Figures, FIG. 1 is a diagram of an operating environment that supports a communication-enabled power management system, according to an example embodiment. The most prominent element of FIG. 1 is the server 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. In one embodiment, network 106 is a secure network wherein communications between endpoints are encrypted so as to ensure the security of the data being transmitted. Server 102 is a central controller or operator for the functionality that executes on at least the remote controller 112 and the self-contained receptacle outlet 120, via various methods.

FIG. 1 further includes a remote controller 112, which each may be smart phones, mobile phones, tablet computers, handheld computers, laptops, or the like. The user remote controller 112 corresponds to the user 110. FIG. 1 further includes a self-contained receptacle outlet 120, a self-contained vent 130, a self-contained switch 140, and a security component 150. In some embodiments, system 100 may further include a thermostat in communication with said devices. It is understood that system 100 may include a plurality of each of the aforementioned devices. Both the remote controller 112, the self-contained receptacle outlet 120, and the second self-contained devices 130, 140, 150 are computing devices. Each of the computing devices include a user interface and/or graphical user interface. In certain embodiments, the system may communicate between the user and the self-contained devices over the communications network, where the user is the person occupying the environment in which the self-contained devices are disposed.

FIG. 1 further shows that server 102 includes a database or repository 104, which may be one or more of a relational databases comprising a Structured Query Language (SQL) database stored in a SQL server, a columnar database, a document database and a graph database. Remote controller 112 and self-contained receptacle outlet 120 may also include their own database. The repository 104 serves data from a database, which is a repository for data used by server 102 and the mobile devices during the course of operation of the invention. Database 104 may be distributed over one or more nodes or locations that are connected via network 106.

The software may configured to create records for the users. The database 102 may include a stored record for each of the users in the system. The database may be configured to store a subset of user attributes including non personal identifying information ("PII") data. PII means information that identifies, relates to, describes, is capable of being associated with, or could reasonably be linked, directly or indirectly, with a particular user. Non PII data may include information that is anonymous and cannot identify the user. Non PII data helps protect the user such that the information may not be used to harm the user. Non PII data may include device type, language preference, time zone, etc. Non PII data may improve operations and services without compromising individual privacy.

FIG. 1 shows an embodiment wherein networked computing devices 112, 120, 130, 140, and 150 may interact with server 102 and repository 104 over the network 106. Server 102 includes a software engine that delivers applications, data, program code and other information to networked computing devices 112, 120, 130, 140, and 150. The software engine of server 102 may perform other processes such as audio and/or video streaming or other standards for transferring multimedia data in a stream of packets that are interpreted and rendered by a software application as the packets arrive. It should be noted that although FIG. 1 shows only two networked mobile computing devices 112, 120, 130, 140, and 150, the system of the present invention supports any number of networked computing devices connected via network 106, having at least the remote controller 112 and the self-contained receptacle outlet 120.

Server 102 also includes program logic comprising computer source code, scripting language code or interpreted language code that is compiled to produce executable file or computer instructions that perform various functions of the present invention. In another embodiment, the program logic may be distributed among more than one of server 102, computing devices 112, 120, 130, 140, and 150, or any combination of the above.

Note that although server 102 is shown as a single and independent entity, in one embodiment of the present invention, the functions of server 102 may be integrated with another entity, such as each of computing devices 112, 120, 130, 140, and 150. Further, server 102 and its functionality, according to a preferred embodiment of the present invention, can be realized in a centralized fashion in one computer system or in a distributed fashion wherein different elements are spread across several interconnected computer systems.

Figure 3B:
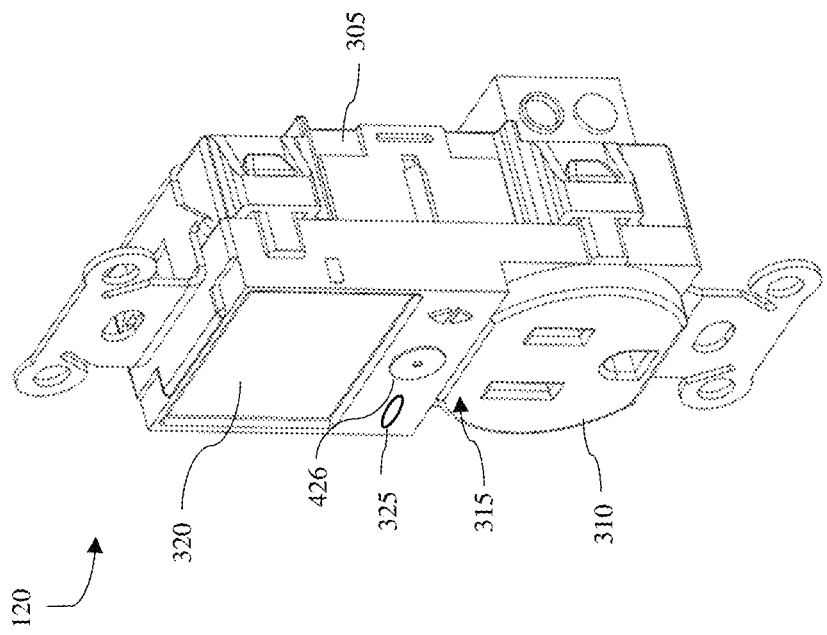
FIG. 3B is a perspective view of the self-contained receptacle outlet, according to an example embodiment.
Figure 3A:
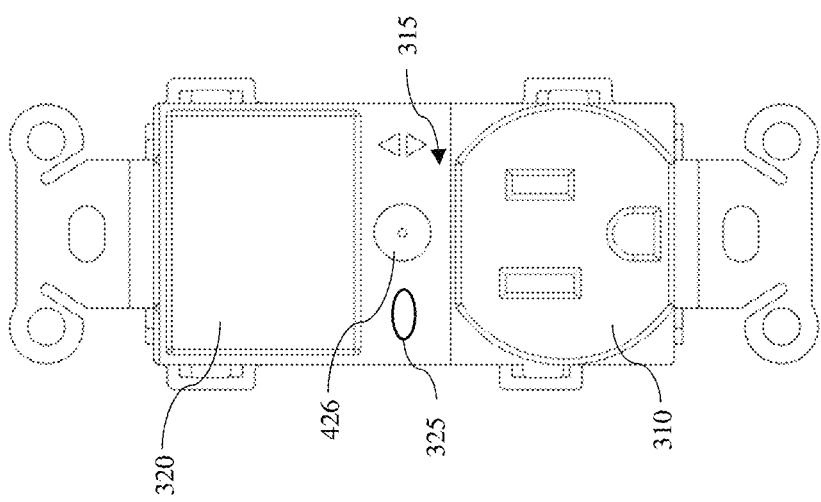
FIG. 3A is a front view of a self-contained receptacle outlet, according to an example embodiment.
Figure 4:
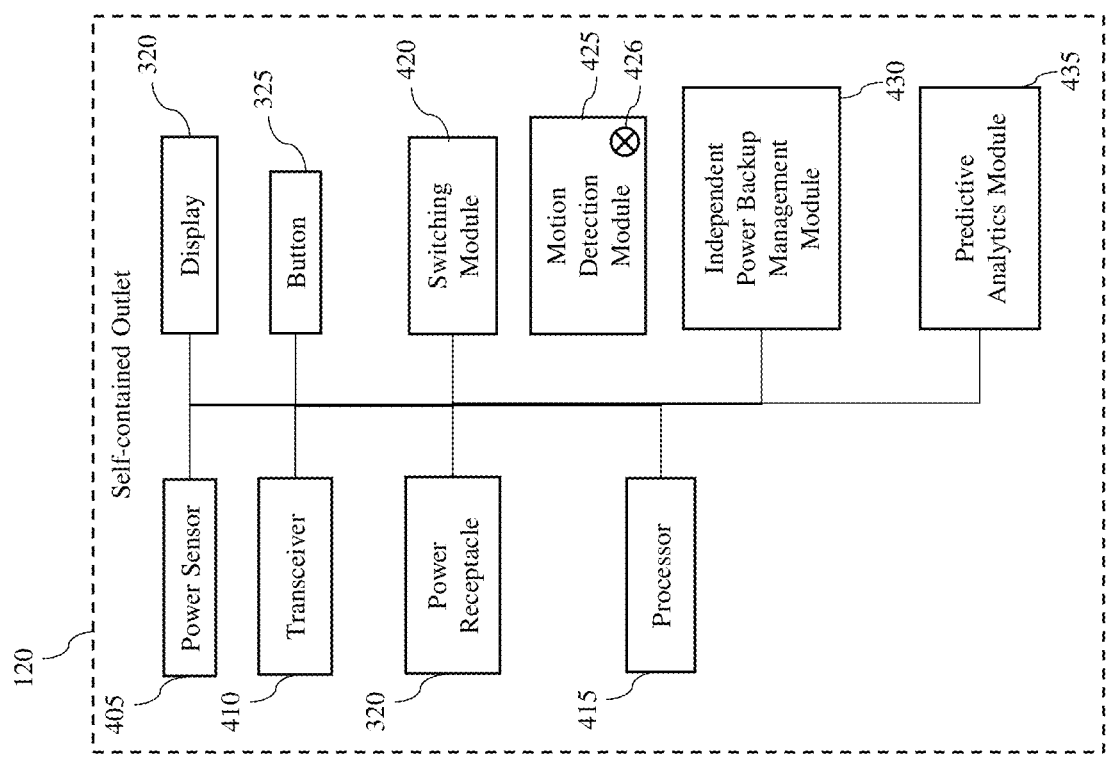
FIG. 4 is a block diagram illustrating the electrical communication between the main electrical components of the self-contained receptacle outlet, according to an example embodiment.

With reference to FIGS. 3A through 4, the self-contained receptacle outlet 120 will be described. FIG. 3A is a front view of the self-contained receptacle outlet 120, according to an example embodiment. FIG. 3B is a perspective view of the self-contained receptacle outlet 120, according to an example embodiment. FIG. 4 is a block diagram illustrating the electrical communication between main electrical components of the self-contained receptacle outlet 120, according to an example embodiment. The housing of the self-contained receptacle outlet is a structural enclosure designed to protect and support the various components of the power management system. Generally, the housing 305 serves as the outer shell, providing both physical protection against environmental factors and an organized framework for the outlet's internal components. It may be constructed from durable materials, such as high-grade thermoplastic or metal, used for their strength, heat resistance, and electrical insulation properties. The housing material ensures that the outlet can withstand the typical wear and tear associated with everyday use, as well as the potential thermal stresses from electrical currents. Specifically, the housing has a front face that is accessible to the user. This front face includes the power receptacle 310, which allows standard electrical plugs to connect with the outlet. The front face also features an integrated display and user interface, through which users can interact with the outlet by viewing real-time power parameters or toggling between different states. The design of the front face ensures that these elements are easily visible and accessible, promoting convenient user interaction. In some embodiments, the front face may also include a button 325 for selecting or adjusting the displayed power parameter, providing users with direct control over the outlet's functions.

Internally, the housing 305 is configured to securely contain and organize essential components such as the power sensor, transceiver, processor, switching module, motion detection module, and power backup management module. Each component is carefully positioned within the housing to ensure optimal performance and minimal interference. For example, the housing may include internal compartments or mounting brackets to hold each component in place, preventing movement or damage due to vibration. Additionally, the internal layout may include channels or partitions to facilitate airflow and prevent overheating, especially when high currents are involved.

The power receptacle 310 disposed on the outward face 315 on the front face of the housing is a standard electrical outlet designed to provide a direct connection point for various electrical devices. Generally, the power receptacle includes one or more sets of slots corresponding to common plug configurations, such as, but not limited to, Type A or Type B outlets in North America. These slots are shaped and spaced to accommodate the prongs of the plug, allowing for a snug fit that minimizes the risk of accidental disconnection.

The self-contained receptacle outlet further includes the power sensor 405 configured to monitor a plurality of power parameters. The power sensor functions as a diagnostic tool that gathers essential data on the electrical characteristics of the outlet's connected load. Specifically, the sensor is capable of measuring voltage levels across the receptacle's terminals, as well as the current flowing to the connected device. These measurements are then used to calculate power consumption, providing insights into the amount of energy being used by the device over time. This real-time tracking of energy usage is essential for identifying inefficiencies, assessing power quality, and implementing energy-saving measures. The sensor is designed to operate reliably within the confined space of the outlet housing and under varying environmental conditions. It is generally embedded in close proximity to the power receptacle to ensure accurate readings, while being electrically isolated from other components to prevent interference. Advanced filtering techniques may be applied within the sensor circuitry to eliminate noise and ensure high-fidelity measurements. By continuously monitoring power parameters, the sensor enables the system to detect anomalies or irregularities in power supply, such as surges, drops, or fluctuations in frequency. These insights allow the system to make informed decisions, such as switching the outlet to an energy-saving state, engaging the independent power backup management module, or triggering an alert to the user via the transceiver. Moreover, the sensor's data is essential for predictive analytics, as it provides the foundational information needed to anticipate future power consumption and optimize the receptacle's operation.

The transceiver 410 within the housing of the self-contained receptacle outlet serves as the primary communication interface for the power management system, enabling two-way wireless communication between the outlet and external devices. Positioned within the housing, the transceiver is configured to transmit and receive data signals, facilitating remote monitoring and control of the outlet's various functions. This component is essential for the system's operation, as it allows real-time interaction between the outlet and other elements such as a remote controller, additional self-contained devices, and potentially a central control hub. The transceiver is designed to handle multiple types of data exchanges, such as commands to change the power state, updates on power parameters, and alerts in response to detected events. It communicates using established wireless communication protocols like, but not limited to, Wi-Fi, Zigbee®, or Bluetooth®, which ensure compatibility with a wide range of devices and home automation systems. In some embodiments, the transceiver may support multiple protocols simultaneously, allowing it to interface with diverse devices and networks.

Specifically, the transceiver can receive signals from a remote controller, such as commands to switch between the on-state, off-state, or energy-saving state. Upon receiving such commands, the transceiver communicates with the outlet's processor 415, which then executes the appropriate action. The transceiver is equally capable of transmitting data back to the remote controller or other connected devices. For example, it can send updates on real-time power parameters monitored by the power sensor, or it can transmit notifications when the outlet detects a power anomaly or an emergency event. This bidirectional communication capability ensures that users are always informed and can exercise control over the outlet from a remote location.

The switching module 420, coupled to the housing of the self-contained receptacle outlet, enables users to control the flow of electrical power to a connected device. This module provides the ability to switch between an on-state, where electrical power is actively supplied to the connected device, and an off-state, where power is cut off, thereby halting the flow of electricity. Its design allows for both manual and automated control, ensuring flexibility and adaptability in various operational scenarios. The switching module functions as an electrical gatekeeper within the outlet, directly regulating the circuit that supplies power to the connected device. When in the on-state, the switching module closes the circuit, allowing electrical current to flow from the power source through the receptacle to the connected device. Conversely, when switched to the off-state, the module opens the circuit, effectively disconnecting the power supply and preventing any current flow to the device. This ability to toggle between states enables precise control over energy consumption, facilitating power savings and enhancing device safety by eliminating the risk of unintended power use.

The switching module may include either electromechanical relays or solid-state switches, depending on the design and intended application. Electromechanical relays consist of mechanical contacts that physically open or close in response to an electromagnetic coil, making them well-suited for applications where durability and robustness are required. Solid-state switches, such as MOSFETs or TRI-ACs, use semiconductor components to control the circuit electronically, offering faster switching speeds and silent operation with minimal wear and tear. Both types of switches can handle frequent switching without significant degradation, ensuring a long operational life for the outlet.

The switching module 420 is configured to respond to signals from the outlet's processor, which in turn receives commands from other components like the motion detection module or a remote controller via the transceiver. This setup allows for automated switching based on specific conditions. For example, when motion is detected in a predefined area, the processor may instruct the switching module to activate the on-state, thereby powering any connected device. Alternatively, if no motion is detected for a specified period, the processor can signal the switching module to enter the off-state, reducing unnecessary power consumption.

For user convenience, the switching module 420 may also allow for manual control, either through a button on the outlet itself or via a remote control interface. This enables users to override automated settings as needed, providing direct control over the power state of the connected device. The switching module's capability to switch between states seamlessly, based on both manual input and automated triggers, makes it versatile and highly responsive to different user needs and environmental conditions.

The motion detection module 425, coupled to the housing of the self-contained receptacle outlet, is configured to control the outlet's power state based on movement within a designated area. Specifically, this module is configured to monitor a first predefined area surrounding the outlet for any motion. Upon detecting motion within this area, the module triggers the outlet to switch to the on-state, thereby supplying power to any connected electrical device. If no motion is detected in the predefined area, the module will switch the outlet to the off-state, effectively stopping the flow of power to conserve energy.

The motion detection module includes at least one sensor 426, enabling the outlet to respond dynamically to the presence or absence of movement. The module may include passive infrared (PIR) sensors, ultrasonic sensors, or microwave-based sensors to detect changes in the surrounding environment. PIR sensors are commonly used because they detect the infrared radiation emitted by warm objects, such as human bodies, making them both energy-efficient and reliable. Alternatively, ultrasonic or microwave sensors can detect motion by emitting sound waves or radio waves, respectively, and analyzing the reflections, making them suitable for detecting subtle movements in a wider range or more complex environments.

The module is calibrated to focus on the predefined area, which is specified based on the typical range and coverage required for the installation environment. This area can be adjusted during installation or setup to accommodate different room sizes and layouts, allowing the module to operate effectively in a variety of settings. By focusing solely on this predefined area, the module minimizes the likelihood of false positives caused by movement outside the target zone, thus ensuring that the outlet only switches to the on-state when motion occurs within the intended monitoring area.

In operation, when the motion detection module senses movement within the predefined area, it sends a signal to the outlet's processor, instructing it to switch the outlet to the on-state. This process occurs in real time, enabling a rapid response that immediately provides power to the connected device as needed. Conversely, if the module does not detect any motion over a specified period, it signals the processor to switch the outlet to the off-state, conserving energy by halting power to the device. This automated switching capability is particularly advantageous in spaces where devices do not need to be continuously powered, such as offices, conference rooms, or residential areas. The motion detection module provides a highly efficient method of managing power based on real-world usage patterns. By automatically switching the outlet to the on-state or off-state in response to motion, it eliminates the need for manual intervention, reduces energy wastage, and enhances user convenience. Additionally, it improves safety by ensuring that power is only available when needed, which is particularly useful for controlling devices that may pose a hazard if left on unattended.

The independent power backup management module 430, coupled to the housing of the self-contained receptacle outlet, ensures continuous power availability during disruptions. Specifically, this module is configured to monitor the outlet's power parameters, such as voltage, current, or frequency, and activate a backup power source if one or more of these parameters fall below a specified threshold. By doing so, the module allows the outlet to switch to the on-state, thereby maintaining power to connected devices even when the primary power supply is compromised. The power backup management module functions as an autonomous system within the outlet, constantly analyzing the electrical input to detect any irregularities that could indicate a power failure or degradation in supply quality. Upon identifying that a monitored parameter has dropped below its predefined threshold, the module immediately engages an internal backup power source, such as a rechargeable battery or supercapacitor, which is integrated within the outlet's housing. This transition is designed to be seamless, so that the connected devices experience minimal or no interruption in power. The power backup management module can be equipped with energy storage components like lithium-ion or nickel-metal hydride batteries for compact, high-capacity storage, or supercapacitors for rapid discharge and recharge cycles. These storage solutions are chosen based on their ability to supply sufficient power to maintain the outlet's on-state for a short duration, typically enough to bridge minor power interruptions or sustain critical devices until the primary power supply is restored. For example, in residential or commercial settings, this capability ensures that essential devices, such as routers, alarm systems, or medical equipment, continue to function during brief outages.

In operation, when the module detects a power parameter falling below the threshold, such as a significant voltage dip, it automatically switches the outlet to the on-state by engaging the backup power supply. This is especially useful in scenarios where maintaining power continuity is vital, and users need devices to remain operational regardless of fluctuations or failures in the main power grid. The module is designed to revert to the primary power source once the parameters return to acceptable levels, preserving the backup supply for future use and optimizing overall power management.

The backup module may be engineered with charge management circuits that oversee the charging and discharging of the backup power source, ensuring that it remains fully charged and ready for activation when needed. This also includes protection mechanisms to prevent overcharging, overheating, or deep discharge, which could otherwise reduce the lifespan of the energy storage components.

The predictive analytics module 435, coupled to the housing of the self-contained receptacle outlet, is configured to optimize power usage by dynamically assessing the occupancy of a second predefined area. This module continuously analyzes data to determine when the area is unoccupied by beings and, based on calculated probabilities, decides whether to switch the outlet into an energy-saving state. By proactively adjusting the outlet's power state based on occupancy patterns, the module contributes significantly to reducing energy consumption. Functionally, the predictive analytics module operates by collecting data from motion sensors, historical usage patterns, and possibly other environmental inputs such as light levels or temperature. Using this data, the module applies algorithms that forecast occupancy likelihood. These algorithms can include machine learning techniques or statistical models that improve over time, allowing the module to refine its predictions based on past behavior and emerging trends within the monitored area. For example, the module might learn to recognize patterns indicating that an office is typically vacant during lunchtime or that a residential room is rarely used during certain hours of the day.

Specifically, when the predictive analytics module detects that the probability of occupancy in the second predefined area is below a certain threshold, it triggers the outlet to switch to an energy-saving state. This state reduces or halts the power flow to connected devices, thus conserving energy during periods of non-use. The occupancy threshold can be configured based on user preferences or environmental conditions, providing flexibility to adapt the system to different spaces and usage habits. For instance, in a commercial setting, the threshold might be set to ensure that lights and equipment power down when an office space is unoccupied for a certain period, while in a residential setting, the threshold might be adjusted to accommodate more variable patterns. The module's design allows it to work autonomously, minimizing the need for manual adjustments by users. It can operate continuously and in real-time, making adjustments as soon as occupancy predictions change. This ability to forecast and respond to anticipated use is a marked improvement over traditional motion-activated systems, which only react to immediate, observed motion and often leave devices powered unnecessarily during brief, intermittent periods of inactivity. By contrast, the predictive analytics module provides a more nuanced and anticipatory approach to power management.

The predictive analytics module may include embedded software that handles data analytics, decision-making algorithms, and communication protocols to interact with other system components. The module is also designed with low-power electronics, ensuring that its continuous operation does not offset the energy savings it provides. Furthermore, the module can be configured to collaborate with other self-contained devices within the power management system, such as vents or switches. For example, if the predictive analytics module determines that the area is likely to remain unoccupied, it could signal associated devices to reduce heating, cooling, or lighting in that area, further enhancing overall energy efficiency. The system also utilizes the predictive analytics module to leverage historical occupancy patterns and external temperature data to adjust room-specific temperature settings, particularly during periods such as nighttime.

The display 320 on the front face 315 of the housing provides a user interface that visually communicates real-time information on power parameters. Positioned on the outward-facing side of the housing, this display allows users to monitor essential data about the outlet's operational status directly at the outlet itself. The display is configured to show at least one power parameter from a set of monitored parameters, which can include voltage, current, power consumption, frequency, or power factor. The display is designed with a compact, yet highly visible screen that can be easily read from a reasonable distance. The display technology can vary based on the intended use and desired visual qualities, with options such as LED or OLED screens commonly employed for their brightness, energy efficiency, and durability. These display types offer clear and bright readouts, ensuring that users can easily interpret the data under various lighting conditions, including bright sunlight or dim indoor settings. The user interface on the display is configured to be intuitive, allowing users to navigate and interpret power parameters without requiring extensive interaction. In its simplest form, the user interface might display a single power parameter at a time, which can be toggled through by pressing a button on the outlet. For example, pressing the button once might show the current voltage, pressing it again might display the current, and pressing it a third time could reveal total power consumption. This setup provides users with a straightforward way to access multiple types of data in sequence, without overwhelming them with information.

The display may also include visual indicators or icons to help users quickly understand the system's current state. For instance, different icons could indicate whether the outlet is in the on-state, off-state, or energy-saving state, providing additional context to the numerical data being shown. Additionally, the display might include color-coded elements, such as green for normal power consumption or red for an alert, which help users quickly assess the outlet's status at a glance. In operation, the display works in conjunction with the outlet's processor and power sensor, which continuously monitor the power parameters and update the display as new data becomes available. This real-time feedback allows users to make informed decisions about their power usage, such as identifying when connected devices are consuming excessive power or when an energy-saving mode might be appropriate. The user interface can be further enhanced by integrating touch-sensitive controls, which would allow users to interact directly with the display to select parameters or access additional information. While this functionality may vary between embodiments, touch controls would provide a more interactive experience and potentially allow for a more complex interface with additional features like historical data or usage trends.

The button 325 on the front face 315 of the housing allows users to toggle through various power parameters displayed on the user interface of the self-contained receptacle outlet. Positioned adjacent to the display, this button is conveniently accessible, enabling users to interact with the outlet and access real-time data on power consumption and other operational metrics directly from the outlet itself. Functionally, the button serves as a control mechanism that lets users cycle through the monitored power parameters, which can include voltage, current, power consumption, frequency, and power factor, among others. By pressing the button, users can sequentially display each parameter on the screen, with each press updating the user interface to reflect the next data point in the set. This feature provides users with an easy way to check on specific aspects of the outlet's performance without the need for external devices or complex controls.

From an operational perspective, the button works in conjunction with the outlet's processor, which interprets the button presses and updates the display accordingly. The processor tracks the sequence of parameters and ensures that each press of the button triggers a smooth transition to the next parameter. This process is designed to be both fast and responsive, allowing users to quickly toggle through the available data points without delay. The button's functionality is especially valuable in settings where users need to monitor multiple aspects of power usage or troubleshoot electrical issues. By providing immediate access to specific parameters, the button enhances the outlet's usability and ensures that users can efficiently manage power consumption. Additionally, it simplifies the user interface by consolidating control into a single, easy-to-use component, eliminating the need for multiple buttons or a complex control panel on the self-contained receptacle outlet.

The processor 415, coupled to the housing of the self-contained receptacle outlet, serves as the central control unit for the power management system. This processor is responsible for executing commands, managing data flow, and coordinating the various functional components within the outlet. Within the housing, the processor is physically positioned in a manner that enables it to interface efficiently with all essential components of the outlet, including the transceiver, power sensor, switching module, and motion detection module. Functionally, the processor is responsible for a range of tasks, from monitoring power parameters and managing power states to interpreting signals from the motion detection module and predictive analytics module. When a change in a power parameter is detected, for instance, the processor processes this information and decides whether any action, such as switching states or alerting users, is required. Similarly, if the motion detection module senses movement or the predictive analytics module indicates a shift in occupancy probability, the processor assesses this input and adjusts the outlet's state accordingly, whether that means switching to an on-state, off-state, or energy-saving state.

The processor also manages communication between the outlet and external devices via the transceiver. When commands are received from a remote controller or other connected devices, the processor decodes these signals, verifies their authenticity using the unique identifier, and executes the appropriate actions. This enables users to remotely control the outlet's functions and monitor real-time power data, further enhancing the system's flexibility and usability. Additionally, the processor is often equipped with storage and processing capabilities that allow it to handle data analytics tasks, particularly those related to the predictive analytics module. It can analyze historical power usage data, occupancy patterns, and other environmental factors to make informed decisions that optimize energy consumption. For this reason, the processor may incorporate advanced microcontroller technology, capable of performing complex computations quickly and efficiently.

The self-contained receptacle outlet 120 further includes a subset power mode, or a specific operating state, defined by set of input parameters received from the remote controller. These input parameters, which are transmitted wirelessly from the remote controller, dictate how the outlet manages power flow to connected devices under specific conditions, allowing users to tailor the system's behavior for different scenarios. These input parameters may include, but are not limited to, power limits or caps, timing schedules, energy-saving preferences, and device-specific behaviors. Energy-saving preferences are instructions to limit energy consumption by lowering power to devices or switching to energy-efficient settings when certain thresholds (like occupancy or temperature) are met. Device-specific behaviors include parameters that control how certain connected devices, such as heaters or lighting systems, are powered or managed during the subset power mode. The subset power mode allows for flexible and dynamic control over power management, helping to reduce unnecessary energy consumption and meet user-defined efficiency goals. Once the input parameters are received from the remote controller, the self-contained receptacle outlet's processor interprets and applies them to manage power flow according to the user's preferences. The processor may store these input parameters associated with a certain subset power mode.

By example, in a smart home, the user may want to minimize energy consumption during the night. The user configures the subset power mode from a remote controller by setting a power limit of 50 watts for all devices connected to the outlet between 10:00 PM and 6:00 AM, scheduling the outlet to automatically power off non-essential devices, such as desk lamps and monitors, during this period, and defining an energy-saving preference to reduce power to the room heater when the room is unoccupied for more than 20 minutes.

Figure 6:
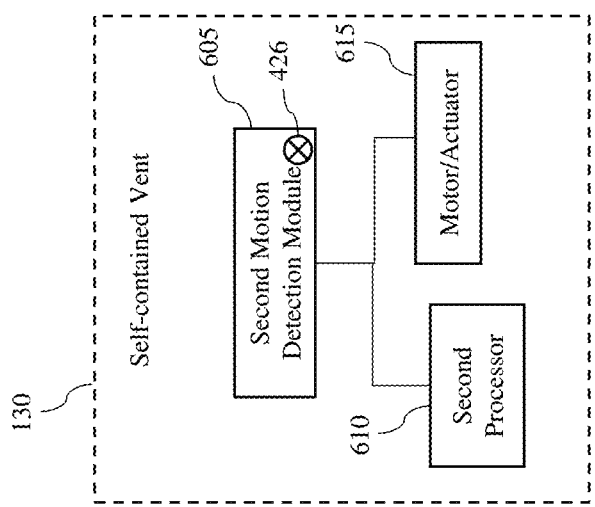
FIG. 6 is a block diagram illustrating the electrical communication between the main electrical components of the second self-contained device, wherein the second self-contained device is the vent, according to an example embodiment.
Figure 5:
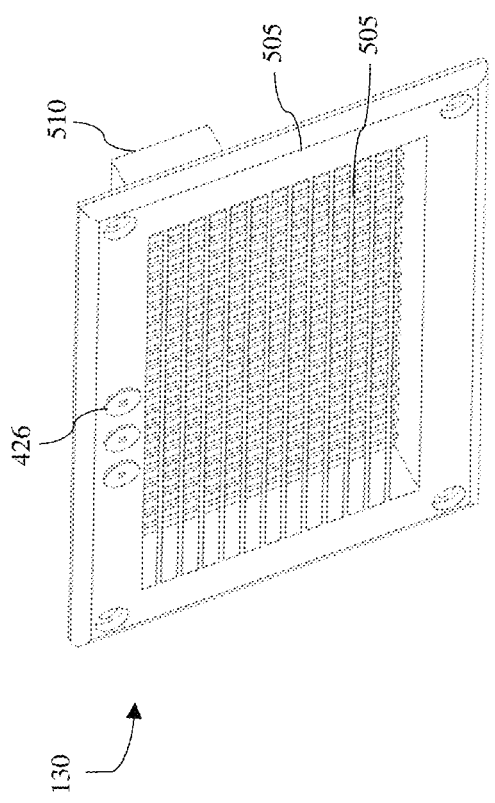
FIG. 5 is a perspective view of the second self-contained device, wherein the second self-contained device is a vent, according to an example embodiment.

With reference to FIGS. 5 and 6, the second self-contained device will be described. FIG. 5 is a perspective view of the second self-contained device, wherein the second self-contained device is the vent 130, according to an example embodiment. FIG. 6 is a block diagram illustrating the electrical communication between main electrical components of the second self-contained device, wherein the second self-contained device is the vent 130, according to an example embodiment. The self-contained vent 130 is used to regulate airflow and environmental conditions within a space. This vent includes an adjustable frame 505 that can open or close based on signals from system, optimizing air circulation to maintain desired temperature or humidity levels. The vent 130 includes housing 510 which may contain the main electrical components. The self-contained vent is equipped with a second motion detection module 605, which allows it to respond to occupancy change and includes sensor 426. When motion is detected within a designated area, the vent can open to improve ventilation, and when no motion is detected, it can close to conserve energy. The vent's adjustable frame 505 may incorporate motorized louvers or grilles that adjust in real-time, controlled by a second processor 610 that responds to the motion detection data, enhancing both comfort and energy efficiency within the space. The vent frame forms the outer structure or housing that holds the adjustable grille in place. The adjustable grille is the part of the vent that can move to regulate the flow of air. It consists of slats or louvers that are designed to be repositioned to either allow air to flow through the vent or to block the airflow. The grille is attached to the vent frame in such a way that it can pivot or slide between different positions.

The vent frame coupled to an adjustable grille includes at least one integrated opening, an open configuration and a closed configuration. The integrated opening refers to the specific areas within the adjustable grille that allow air to pass through when the grille is in the open configuration. These openings are the gaps or spaces between the slats or louvers of the grille. The size and shape of the openings are carefully designed to manage airflow efficiently, ensuring that air is directed into the room when needed while preventing drafts or leaks when the vent is closed. In the open configuration, the adjustable grille is positioned in such a way that the integrated openings are fully exposed, allowing air to flow freely through the vent. In the closed configuration, the adjustable grille is positioned to block the integrated openings, preventing air from passing through the vent. If the sensors of the security component detect an environmental condition then the second processor changes a state of the self-contained vent between the open configuration and the closed configuration. This process is described further below in step 1215 with reference to FIG. 12 and step 1340 with reference to FIG. 13.

A motor 615 or linear actuator can be integrated into the design of the adjustable grill to automate its movement between the open configuration and the closed configuration. This mechanism allows the grill's slats or louvers to be adjusted automatically, enabling precise control of airflow based on environmental conditions, user input, or system commands, without requiring manual intervention. In addition to fully open or closed positions, the motor can adjust the slats to intermediate angles, providing precise control over how much air enters the room. This allows for finer adjustments based on environmental needs, such as slightly reducing airflow when a room is near the desired temperature. A linear actuator is another mechanical component that can be used to control the adjustable grill. Unlike a motor, which usually rotates to control the grill's slats, a linear actuator creates a push-and-pull motion, extending or retracting to move parts of the grill in a straight line. Other actuators and motors may be used and are within the spirit and scope of the present invention.

Figure 8:
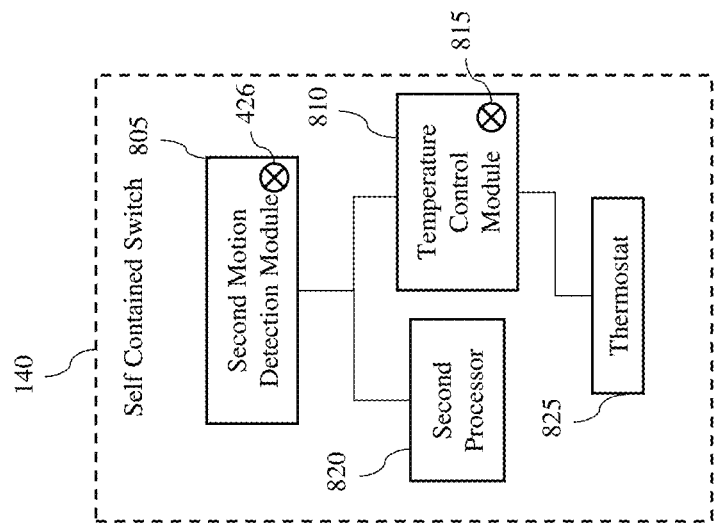
FIG. 8 is a block diagram illustrating the electrical communication between main electrical components of the second self-contained device, wherein the second self-contained device is the switch, according to an example embodiment.
Figure 7:
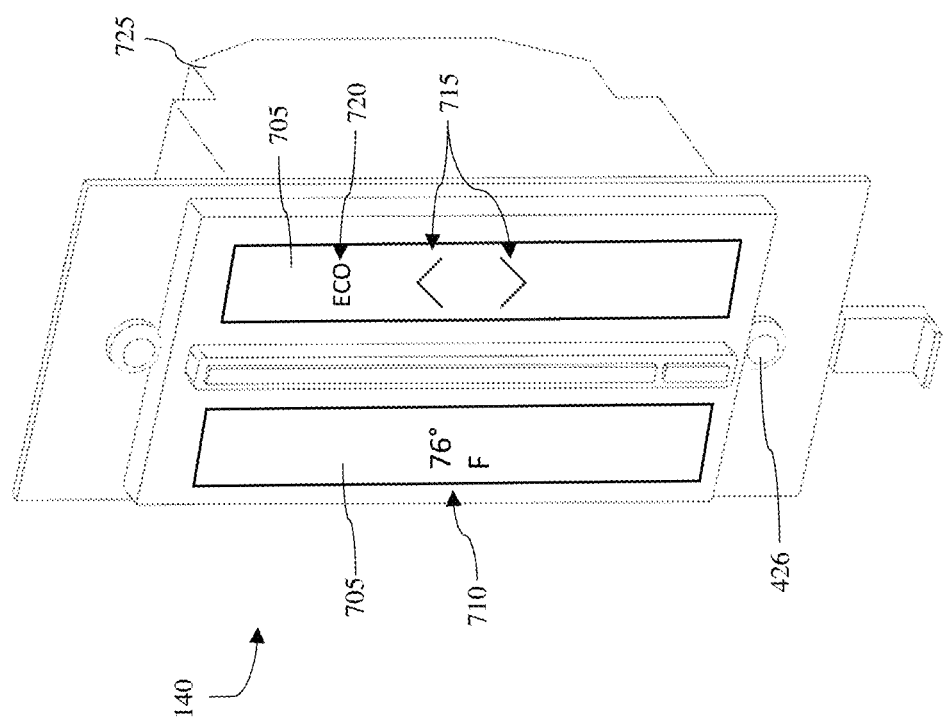
FIG. 7 is a perspective view of the second self-contained device, wherein the second self-contained device is a switch, according to an example embodiment.

FIG. 7 is a perspective view of the second self-contained device, wherein the second self-contained device is the switch 140, according to an example embodiment. FIG. 8 is a block diagram illustrating the electrical communication between main electrical components of the second self-contained device, wherein the second self-contained device is the switch 140, according to an example embodiment. The self-contained switch 140 functions as a power control unit capable of managing the power flow to connected electrical circuits or devices. Housing 725 may contain the main electrical components of the switch 140. Like the vent, the self-contained switch also includes a second motion detection module 805, including sensor 426 and enabling the switch 140 to react to occupancy in its surroundings. Upon detecting motion, the switch, using processor 820 can activate connected lighting, heating, or cooling systems, providing immediate energy where needed. When the motion detection module no longer senses movement, the switch can turn off these systems to save energy. This self-contained switch may be equipped with additional user controls on its front face, such as toggles or buttons, allowing manual overrides and adjustments.

The self-contained switch further includes a temperature control module 810 in electrical communication with a thermostat in communication with an HVAC (Heating, Ventilation, and Air Conditioning) system. This configuration allows the self-contained switch to regulate temperature settings, ensuring optimal climate control while maintaining energy efficiency. The temperature control module is configured to monitor and adjust temperature settings within a space. This module is equipped with sensors 815 that measure ambient temperature and provide real-time data to the system. Based on this data, the temperature control module can send signals to adjust heating or cooling functions via the thermostat 825, which in turn controls the HVAC system. The temperature control module is in electrical communication with a thermostat, meaning that it exchanges information directly with the thermostat via wired or wireless connections. This communication allows the temperature control module to send temperature readings, set new temperature targets, or receive feedback from the thermostat. The thermostat, which acts as the intermediary between the temperature control module and the HVAC system, processes the input it receives and adjusts the HVAC system's operation accordingly. The thermostat coordinates with the HVAC system to maintain the lowest or highest required temperature (depending on heating or cooling) across all rooms while distributing airflow to meet room-specific temperature preferences based on real-time occupancy and outside temperature.

The thermostat is in direct communication with the HVAC system, which manages the heating, cooling, and air circulation within the building. The thermostat receives instructions from the temperature control module and activates or deactivates specific components of the HVAC system (such as heaters, air conditioners, or ventilation fans) to achieve the desired temperature. The HVAC system may also have multiple zones, and the temperature control module within the self-contained switch can be configured to control a specific zone. For example, in a multi-room building, the temperature control module may adjust the temperature in only the room where the self-contained switch is located, without affecting other zones, thereby enabling localized temperature control and improving overall energy efficiency.

In some embodiments, the temperature control module can also be programmed with additional features, such as schedules or energy-saving modes. For instance, the user may set a schedule for the HVAC system to lower the temperature during the night when the space is unoccupied or to raise the temperature just before the occupants arrive in the morning. These settings can be configured through a user interface on the self-contained switch or remotely via a connected device, such as a smartphone or tablet. The temperature control module may also integrate with the predictive analytics functionality of the overall system, allowing it to anticipate temperature adjustments based on occupancy patterns or external environmental factors. For instance, if the system detects that a room will soon be unoccupied, the temperature control module may automatically adjust the HVAC system to reduce heating or cooling, saving energy.

This embodiment provides an improvement through enhanced energy efficiency. By allowing precise control over the temperature in individual zones, the system can prevent energy waste caused by over-heating or over-cooling areas that do not need it. The integration of the temperature control module with the HVAC system also allows for more intelligent climate control, optimizing both comfort and energy savings. The communication between the temperature control module and the thermostat enables immediate and automated adjustments to the HVAC system, reducing the need for manual intervention while ensuring that the system operates only when necessary. This reduces the overall load on the HVAC system, extending its lifespan and reducing maintenance costs.

A display 705 on the front face of the self-contained switch includes a user interface having a temperature indicator 710 based on the sensors of the self-contained receptacle outlets 120 and/or the second self-contained devices 140. The temperature indicator 710 shows the current temperature in the environment, which is based on input from the connected sensors. These sensors can be embedded within the self-contained switch, the receptacle outlet, or another connected device in the system, such as a thermostat or HVAC controller. The interface may display the temperature as a numeric value, such as degrees Celsius or Fahrenheit, and could also feature visual indicators, such as color-coded bars, to represent relative temperature levels (e.g., blue for cooler and red for warmer). The display on the self-contained switch provides more than just a static temperature reading. It can include interactive elements that allow users to adjust temperature settings directly through the user interface. The display may feature touch-sensitive controls 715 or physical buttons next to the screen, enabling users to manually adjust the temperature setpoint for the room or zone. When a user presses these buttons, the temperature indicator on the display will adjust accordingly, showing the new target temperature. The display can also show the current mode of the system, such as heating, cooling, or energy-saving mode (or "ECO"). These modes are triggered based on temperature thresholds and sensor data, and the user interface provides visual feedback, such as icons or text 720, to indicate which mode is active. As the environment changes, the display updates in real time to reflect new temperature readings from the sensors. If a temperature change is detected, such as a rise in heat due to sun exposure or a drop in temperature when a window is opened, the display will update dynamically, showing the new conditions.

Figure 18:
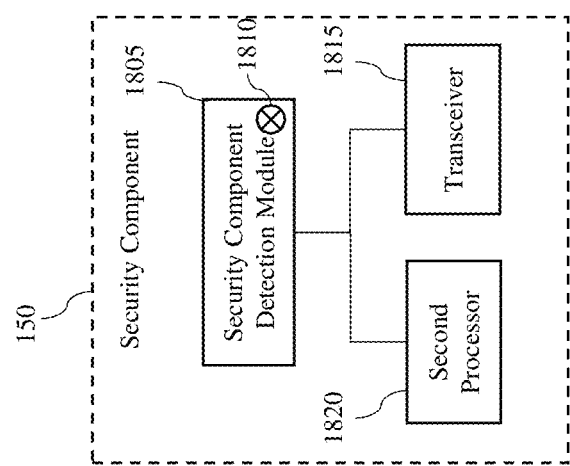
FIG. 18 is a block diagram illustrating the electrical communication between the main electrical components of the second self-contained device, wherein the second self-contained device is a security component, according to an example embodiment.

With reference to FIG. 18, the third example embodiment of the second self-contained device is a security component 150, which is configured to enhance safety by monitoring and responding to potential security risks or emergency events. FIG. 18 is a block diagram of the electrical communication between the main electrical components of security component 150. This device includes a security component detection module 1805 that is capable of monitoring for emergency events or security breaches, such as smoke, fire, or unauthorized entry. The security component is a self-contained device, which could be integrated into devices like a vent, switch, or stand-alone unit within the system. Its primary purpose is to detect specific conditions that could indicate a security threat or emergency and then trigger an appropriate response to mitigate the risk or alert the system and users. The security component module includes sensors 1810 selected from a group consisting of a sensor on an access point of a building, an ionization detector, a photoelectric detector, a heat detector, a combined ionization/photoelectric detector, an infrared sensor, an ultrasonic sensor, a glass break detector, a vibration sensor, a magnetic sensor, a capacitive touch sensor, a pressure mat, a gas detector, and a laser sensor. The security component may be equipped with sensors within the security component detection module, such as, but not limited to, smoke detectors, heat sensors, or door/window contacts, that detect specific conditions or changes in the environment. The security component can include smoke detectors and heat sensors to identify the presence of smoke or an increase in temperature that indicates a potential fire. These sensors continuously monitor the air for signs of combustion, and when smoke or an unusual rise in temperature is detected, the security component detection module sends a signal to processor 1815 to be processed. The signal is then sent via transceiver 1820 to the system's server, remote controller, and/or self-contained devices. In environments requiring protection against unauthorized access, the security component can be equipped with motion sensors, door/window contacts, or glass break sensors. These sensors detect unusual activity, such as movement in a restricted area or the opening of a door or window without authorization. When such an event occurs, the detection module processes the signal and alerts the system.

When an emergency or breach is detected, the security component detection module sends an alert to the system's processor, which can then initiate responses such as powering specific devices, activating alarms, or notifying emergency services. The security component integrates seamlessly with other elements of the system, enabling coordinated responses to enhance occupant safety. For instance, if a smoke detector senses the presence of smoke, the system may automatically cut power to the affected area to prevent electrical fires, send a notification to the remote controller, or even alert emergency services if integrated with an external alarm system. In more advanced configurations, the security component can collaborate with other devices in the system. For example, if the security component detects smoke or fire, it may send a signal to a self-contained vent to open or close, controlling airflow and preventing the spread of smoke. Similarly, if an unauthorized entry is detected, the system might trigger lights or alarms connected to the outlet to deter intruders. The system can also be programmed to initiate automated responses based on the detection module's findings. For example, if a fire is detected, the system might automatically cut power to reduce the risk of electrical fires, activate an emergency power backup for critical devices, or alert occupants via a notification sent to their remote controller. In other situations, the system could provide real-time alerts to users, allowing them to manually assess the situation and decide the next steps, such as calling emergency services or activating additional safety features.

In addition to fire and intrusion detection, the security component can be fitted with sensors for detecting other environmental hazards, such as carbon monoxide, gas leaks, or flooding. These sensors monitor the presence of harmful gases, water, or other dangerous conditions in the environment. When such a hazard is detected, the security component detection module takes immediate action by notifying the system.

In all three cases, these self-contained devices are fully integrated with the system, allowing them to communicate with the main receptacle outlet and other connected devices. They share data and respond dynamically to changes within their respective areas, optimizing both power usage and environmental conditions based on real-time inputs. Furthermore, each device is designed to operate autonomously yet cohesively within the system, meaning they can continue to function and respond to direct stimuli even if the rest of the system is temporarily unavailable. The modularity of the second self-contained device allows for flexible deployment and easy expansion of the power management system to meet specific needs, whether for improved airflow, controlled power switching, or enhanced security monitoring.

Figure 15:
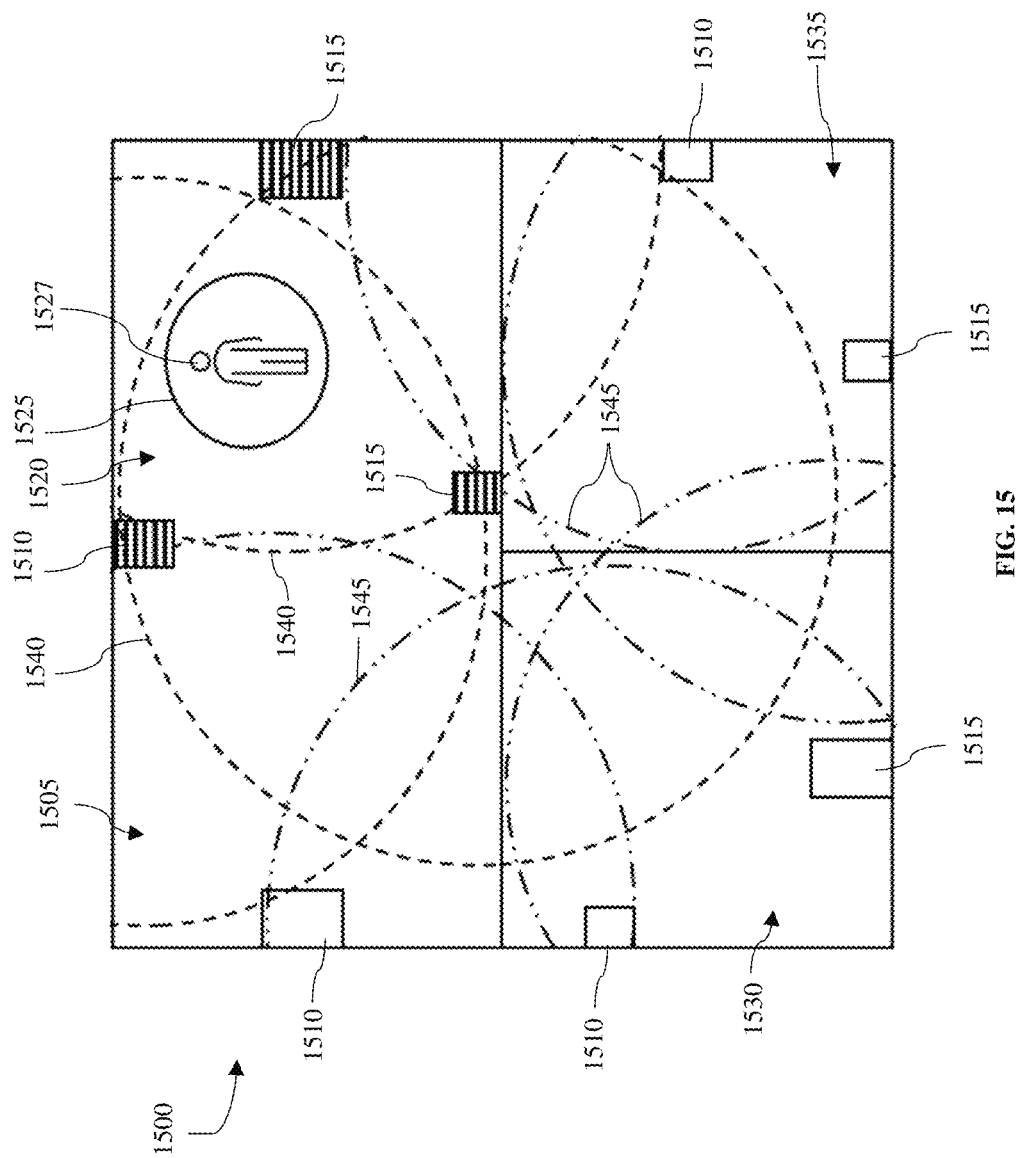
FIG. 15 is a top-down diagram of a plurality of rooms illustrating the sensor detection fields of the self-contained receptacle outlets and devices, according to an example embodiment.

With reference to FIGS. 4, 6, 8, and 15 both the motion detection module 425 of the self-contained receptacle outlet and the second motion detection modules 605, 805 of the second self-contained devices are equipped with a plurality of sensors. FIG. 15 is a top-down diagram 1500 of a plurality of rooms illustrating the sensor detection fields of the self-contained receptacle outlets and devices, according to an example embodiment. These sensors work in unison to detect motion across defined areas and are interconnected to provide comprehensive monitoring within the system. This plurality of sensors may include various types, such as, but not limited to, passive infrared (PIR) sensors, ultrasonic sensors, or microwave sensors, each chosen for their ability to accurately detect movement and relay information about the spatial presence of individuals within a given area.

The sensors are distributed across both the self-contained receptacle outlets and the second self-contained devices. This arrangement enables the modules to monitor multiple zones 1540, 1545 within the predefined areas effectively. By communicating with each other, these sensors create a network that collects detailed information on the movement and positioning of individuals within the areas covered by the system. For example, if the self-contained receptacle outlet 1510 is monitoring a room 1505 and the second devices 1515 (such as vents or switches) are positioned in the same room 1505, the sensors (each with their own detection fields 1540, 1545) within each device collaborate to provide a continuous and overlapping detection field 1520, ensuring there are no gaps in coverage.

The system utilizes at least one processor, either in the self-contained receptacle outlet or the second self-contained device, to analyze the signals received from this network of sensors. This processor is configured to process the incoming data from multiple self-contained devices, allowing it to triangulate and determine the precise location 1525 of a subject 1527 within either the first predefined area (associated with one room 1505) or the second predefined area (associated with another room 1530, 1535). This analysis involves algorithms that can calculate positional data based on the sensor inputs, enabling the system to understand not just the presence of a subject, but their exact position 1525 within the monitored spaces 1505, 1525, 1530.

The ability to determine the location of a subject allows the system to execute targeted actions based on where the individual is within the predefined areas. For example, if a subject is detected near the self-contained receptacle outlet, the processor can decide to switch it into the on-state, powering connected devices. Conversely, if the subject is no longer present in this area but has moved into the zone monitored by the second device, such as a vent, the system may adjust environmental controls like airflow or lighting accordingly. This location-based decision-making process enhances the efficiency and responsiveness of the system, ensuring that resources are used optimally based on real-time occupancy data.

The plurality of sensors working together across both devices also allows for a more accurate and reliable detection system. By cross-referencing data from multiple sensors, the system can reduce false positives and improve the precision of its occupancy assessments. For example, if one sensor detects movement but another sensor in the network does not confirm it, the system may choose to disregard the signal, thus avoiding unnecessary power changes or adjustments based on spurious data.

Figure 2:
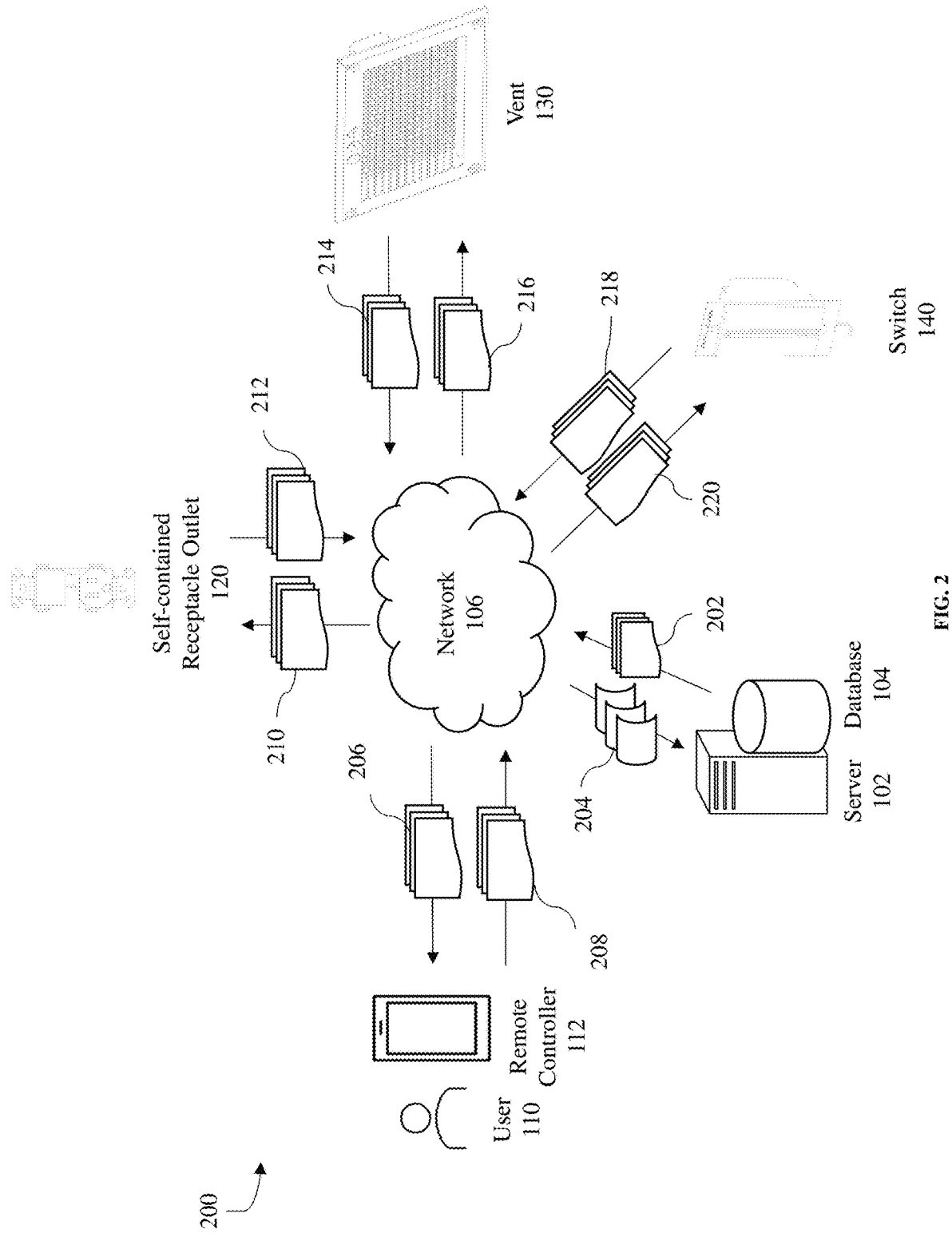
FIG. 2 is a schematic illustrating communication between the entities in FIG. 1 in relation to the communication-enabled power management, according to an example embodiment.

The process for communication-enabled power management will now be described with reference to FIGS. 2 and 9 through 14. FIGS. 2 and 9 through 14 depict, among other things, data flow and control flow in the process for communication-enabled power management, according to one embodiment. FIG. 2 is a schematic 200 illustrating communication between the entities in FIG. 1 in relation to communication-enabled power management, according to an example embodiment. It is understood that in FIG. 2, the data packets 202, 204, 206, 208, 210, 212, 214, 216, 218, and 220 are used to show the transmission of data and may be used at different stages of the process. It is understood by those skilled in the art that the steps of the methods described herein are not limited to the specific order presented. Unless explicitly stated otherwise, the method steps may be performed in different sequences, rearranged, or performed concurrently where appropriate without departing from the scope and spirit of the invention. The described order is merely one exemplary embodiment, and variations in the sequence of steps may be made based on the particular circumstances of the implementation, application, or design preferences. For example, certain steps may be combined, omitted, or repeated depending on the operational conditions or requirements of the system. Accordingly, the scope of the invention should not be construed as being limited to the specific order of steps outlined in the methods.

The user 110 may use the remote controller 112 to communicate with the server 102, self-contained receptacle outlet 120, the second self-contained devices 130, 140 along with the security components and the thermostats. The server 102 may provide graphical user interfaces to each of the remote controller 112 and the self-contained receptacle outlet 120. Each of the graphical user interfaces may be configured to allow the user to interact with the interface, and/or webpage, such that the interface(s) and display(s) may include a plurality of user interface elements such as input controls, navigation components, informational components, and containers. Such user interface elements may include for example, accordions, bento menu(s), breadcrumb(s), button(s), card(s), carousel(s), check box(es), comment(s), doner menu(s), dropdown(s), feed(s), form(s), hamburger menu(s), icon(s), input field(s), kebab menu(s), loader(s), meatball menu(s), modal(s), notification(s), pagination(s), picker(s), progress bar(s), radio button(s), search field(s), sidebar(s), slide control(s), stepper(s), tag(s), tab bar(s), tool tip(s), and toggle(s). Each of these user interface elements may be used in certain embodiments to enable each of the users to interact with the system, provide data to and from the server across the communications network and implement the methods as discussed in FIGS. 9, 10, and 11. Other user interface elements configured to provide a display to the user to interact with the system in accordance with the methods described herein may be used and are within the spirit and scope of the disclosure. The user may interact with the graphical user interfaces using computer gestures to trigger certain elements on the graphical user interfaces. A computer gesture may include gestures such as a tap, via a touch sensitive interface display, a click, on or near one of the second user graphical indicators.

Figure 9:
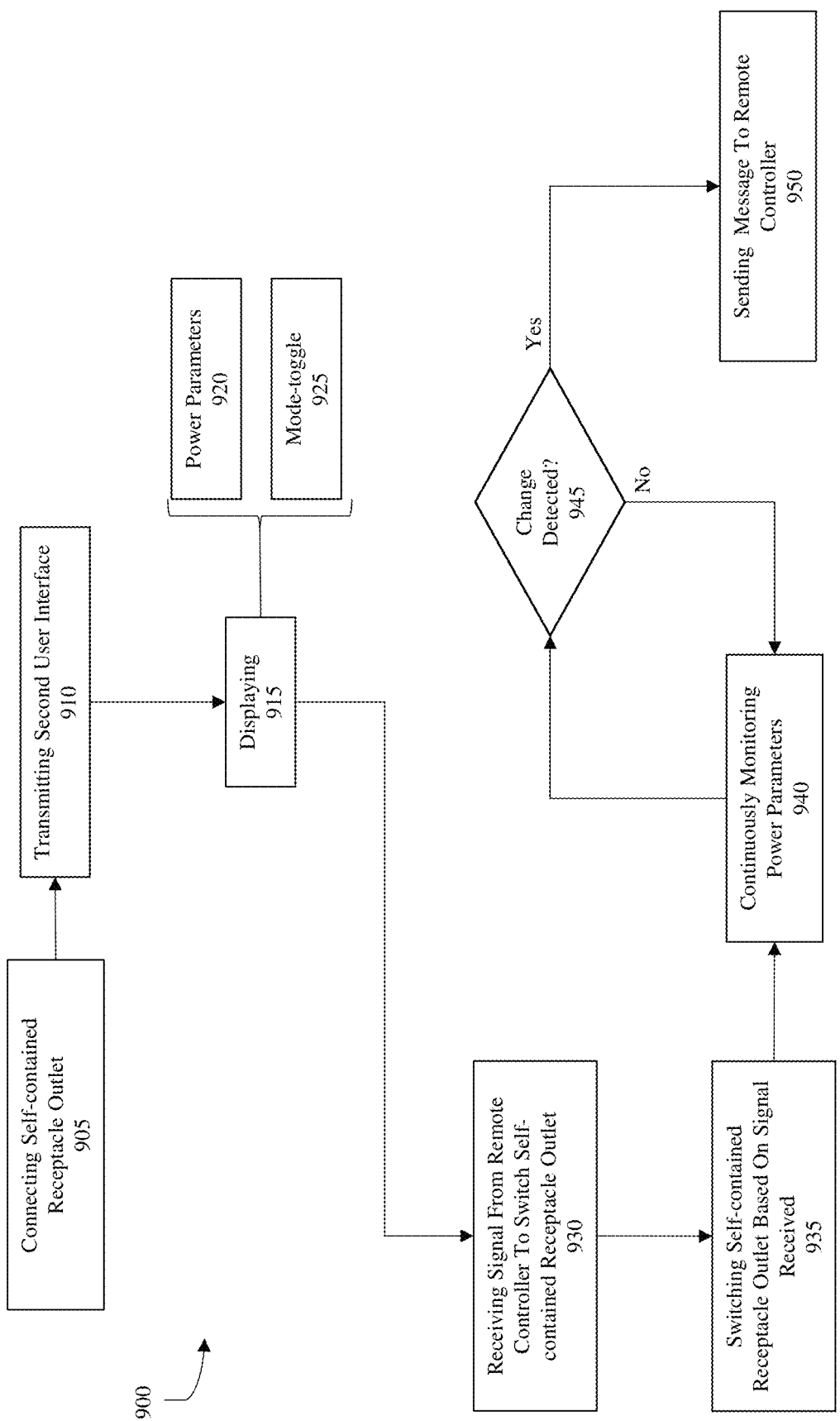
FIG. 9 is a flowchart diagram illustrating the steps for a method of dynamically managing the power flow and states of the system, according to an example embodiment.

With reference to FIG. 9, a flowchart diagram illustrating the steps for a method 900 of dynamically managing the power flow and states of the system 100 is shown, according to an example embodiment. Method 900 begins with step 905, wherein the system connects the self-contained receptacle outlet to a remote controller using the unique identifier. This unique identifier is a distinct code or digital signature assigned to each self-contained receptacle outlet, allowing it to be easily recognized and authenticated by the remote controller or a broader system network. When the process of connecting the outlet to a remote controller begins, the outlet broadcasts its unique identifier via the transceiver. The remote controller, equipped with compatible communication technology, scans for nearby devices, identifying each outlet by its unique identifier. This ensures that each outlet is distinguishable, even if multiple outlets are present within the same environment. Once the remote controller recognizes the unique identifier of the specific self-contained receptacle outlet, a connection is established between the two devices. This connection may be secured using encryption protocols, ensuring that only the designated remote controller, or authorized devices within the system, can communicate with the outlet. The unique identifier contributes to this security by acting as an authentication mechanism, preventing unauthorized devices from gaining access to the outlet's controls or data. By leveraging the unique identifier, this connection not only enables direct control of the self-contained receptacle outlet but also enhances the system's scalability. Each outlet can be individually identified and managed, even in complex environments with multiple outlets, ensuring that users have precise control over specific outlets or groups of outlets without interference. This unique identifier also facilitates broader system integration. In a larger smart home or building energy management system, the unique identifier allows the outlet to be added to a network of devices, such as HVAC systems, lighting, or security components. The remote controller or a centralized management system can then seamlessly coordinate interactions between these devices, with the unique identifier ensuring that commands and data are correctly routed to the intended outlet.

Then, in step 910, system 100 transmits a second user interface to the remote controller 112 to be displayed on the remote controller. Second user interface data is sent within data packet 212 from the transceiver of the self-contained receptacle outlet 120 to the communications network 106. Network 106 sends data packet 206 including the second interface data to the remote controller 112. Then, in step 915, remote controller 112 displays the second user interface. The second user interface includes the plurality of power parameters 920 and a mode-toggle 925 for switching the self-contained receptacle outlet between the on-state, the off-state, and the energy-saving-state. After the connection between the self-contained receptacle outlet and the remote controller is successfully established, the remote controller can access the outlet's functionality through the second user interface.

Next, in step 930, system 100 receives a signal from the remote controller to switch the self-contained receptacle outlet to the on-state, the off-state, and/or the energy-saving-state. Once the user selects the desired state on the user interface, the remote controller generates and transmits a signal to the self-contained receptacle outlet. This signal is sent wirelessly through the transceiver using a communication protocol such as Wi-Fi, Bluetooth, or Zigbee, depending on the system's configuration. The signal contains specific instructions for the outlet, indicating the new state to which the outlet should switch (either on-state, off-state, or energy-saving-state). Upon receiving the signal, the transceiver within the housing of the self-contained receptacle outlet processes the incoming data. This signal is then relayed to the outlet's processor, which decodes the instructions and determines the appropriate action based on the content of the signal.

Next, in step 935, system 100 switches the self-contained receptacle outlet to the on-state, the off-state, and/or the energy-saving-state based on the signal received. When the received signal instructs the outlet to switch to the on-state, the processor triggers the outlet's switching module such that the switching module allows the full flow of electrical power to any device connected to the outlet, effectively turning it on. The processor monitors the outlet's current status to ensure that power is continuously and efficiently supplied to the connected device. Entering the on-state means the outlet is fully active, providing power without restrictions, which is ideal for times when all connected devices need to be in full operation. If the signal instructs the outlet to switch to the off-state, the processor commands the switching module to cut off the flow of electrical power. In this off-state, the outlet effectively disconnects the power supply to the connected device, ensuring that no energy is consumed. This state is particularly useful for reducing power wastage when a device is not in use, preventing phantom loads (standby power consumption). Once the outlet transitions to the off-state, it remains inactive until another signal instructs it to change state. The system may also send a confirmation back to the remote controller, informing the user that the outlet is now off and that no power is being supplied to the device.

When the signal requests the outlet to enter the energy-saving-state, the processor engages more complex functionality. In this mode, the outlet supplies reduced power or activates certain energy-saving measures, depending on the nature of the connected device and the predefined settings. The energy-saving-state is ideal for periods when the device is not in full use but still requires minimal power, such as keeping essential components on standby, maintaining low-power operations, or reducing overall consumption during low-demand periods. For example, in this state, the outlet may reduce the voltage supplied to the connected device or limit the operational capacity of the device to save energy while ensuring basic functions remain active. This energy-saving mode could also involve adjusting the outlet's behavior based on occupancy data from motion sensors or historical usage patterns, ensuring that energy is only consumed when truly necessary. The processor continuously monitors power parameters to maintain optimal energy usage during this state, ensuring that the device stays in a low-consumption mode without sacrificing essential functions.

The entire process of switching between states (on-state, off-state, or energy-saving-state) is managed by the outlet's processor, which ensures that each state transition occurs smoothly. The processor oversees the switching module's response to the signal and continuously monitors the outlet's performance to ensure the selected state is properly maintained. Throughout this process, the transceiver maintains communication with the remote controller, updating it on the current state of the outlet, providing feedback to the user, and ensuring that the system remains responsive to future commands.

In step 940, system 100 continuously monitors the power parameters. The process begins with the power sensor embedded in the self-contained receptacle outlet. This sensor is constantly monitoring various power parameters, such as voltage, current, power consumption, frequency, or power factor. The processor, which is linked to the power sensor, is programmed to recognize specific thresholds or changes in these parameters. For example, a sudden spike in current or a drop in voltage could indicate an abnormality, such as a power surge, equipment malfunction, or even just a typical shift in device power consumption.

Then, in step 945, the processor detects if there is a change in any of the power parameters. When the sensor detects that one or more of these parameters has changed beyond a predefined threshold, the processor immediately registers this event. The nature of the changes may vary. The changes could be an increase or decrease in power consumption, fluctuations in voltage, or other significant deviations from the expected values. The system is designed to monitor these changes in real time, ensuring prompt detection of any anomalies or regular shifts in power use. Once the processor identifies a change in a power parameter, it generates a message that will be sent to the remote controller. This message may include the updated information regarding the changed parameter, along with relevant data such as the time of the change, the magnitude of the shift, and the current state of the outlet (whether it is in the on-state, off-state, or energy-saving-state). The message may also contain diagnostic information, especially if the detected change suggests a potential issue, such as a power surge or drop that could affect the performance or safety of the connected device.

Next, in step 950, system 100 sends a message to the remote controller when a change in at least one of the power parameters is detected. The transceiver of the self-contained outlet sends the message in data packet 212 over network 106, which sends that message in data packet 206 to the remote controller 112. Once the message is transmitted, the remote controller receives it and updates its user interface accordingly. The user is alerted to the change in the power parameter, which may be displayed in the form of a notification or a detailed data readout on the controller's screen. The message could appear as an alert for more critical changes, such as a power surge, or as an informational update if the change is within normal operating ranges, such as a shift to a lower power consumption level in the energy-saving-state.

For instance, if the outlet detects a significant increase in power consumption that might indicate a malfunction or inefficiency, the user could receive a prompt alert on their remote controller. This real-time update allows the user to investigate the cause of the change and, if necessary, adjust the outlet's power state or the connected device's operation to prevent energy wastage or potential damage. This process of detecting, generating, and sending messages is continuous, allowing the user to stay updated on any changes in real-time. The system ensures that the user is never left in the dark about the current power status of connected devices, offering a proactive approach to managing energy usage and ensuring device safety. If power parameters return to normal after a fluctuation, the outlet may send a follow-up message to inform the user that the issue has resolved itself, adding a layer of reassurance and transparency.

Figure 10:
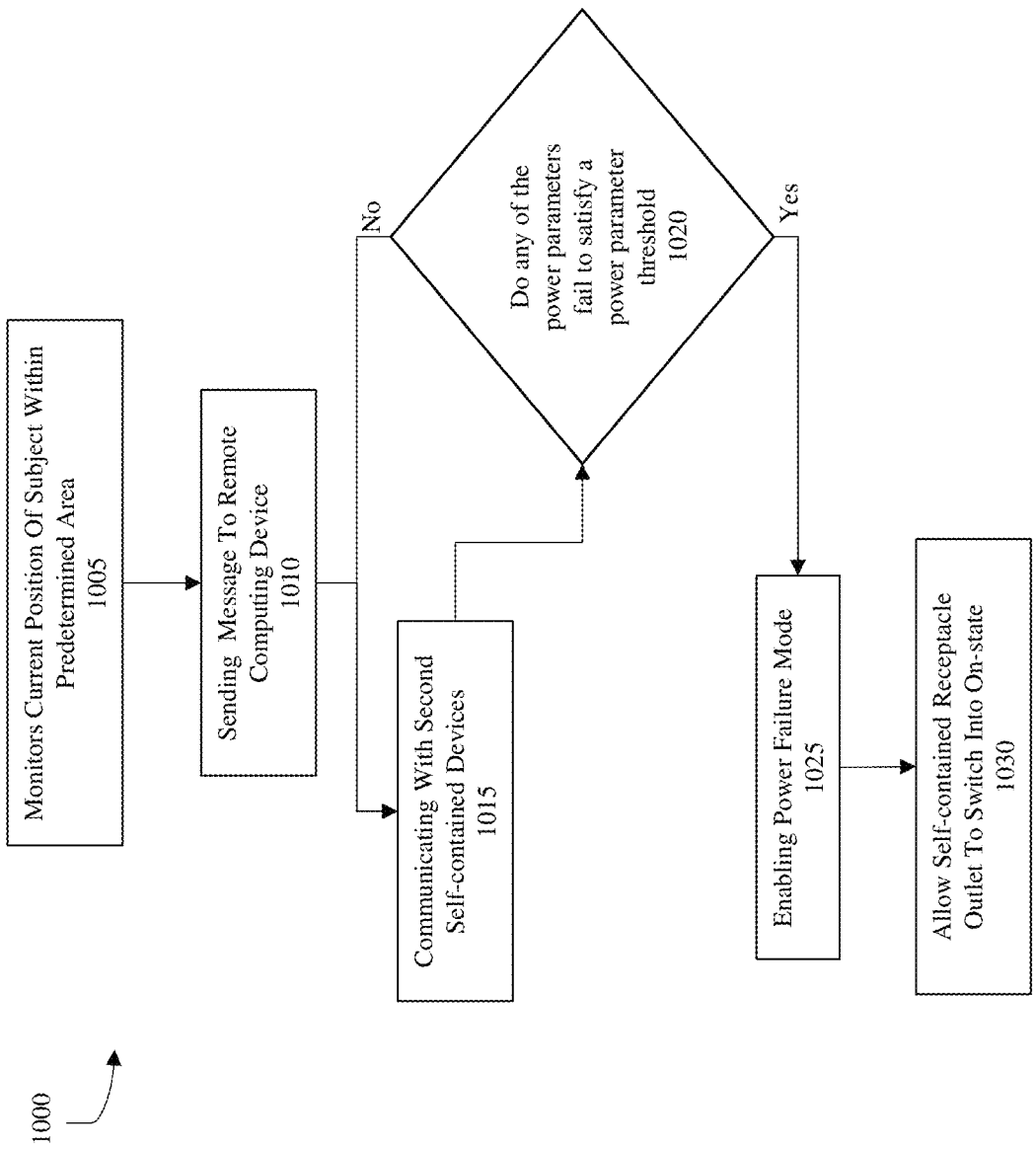
FIG. 10 is a flowchart diagram illustrating the steps for a method of switching states of an occupied predefined area, according to an example embodiment.

With reference to FIG. 10, a flowchart diagram illustrating the steps for a method 1000 of switching states of an occupied predefined area is shown, according to an example embodiment. In step 1005, system 100 monitors a current position, using the motion sensors, of a subject within a predetermined area in real-time. As the subject moves within the area, the sensors continuously capture data about the subject's position. This data is updated in real time, allowing the system to track the subject's current location with high accuracy. The plurality of sensors ensures that even subtle movements are detected and accounted for, providing a seamless tracking experience. The data collected by the sensors is transmitted to the processor of the self-contained receptacle outlet or the second self-contained device, where it is processed and analyzed. The processor uses algorithms to interpret the sensor signals, determining the subject's exact location within the predefined area. This involves comparing input from multiple sensors to establish the subject's coordinates in relation to the sensors' fixed positions. For example, if the system includes multiple motion detectors distributed around a room, each sensor provides a different perspective on the subject's movement. By analyzing the timing and intensity of the signals from each sensor, the processor can calculate the subject's precise location within the room, continuously updating the position as the subject moves. This real-time processing ensures that the system can react immediately to changes in the subject's location. If the subject moves from one part of the area to another, the system will instantly register this change, enabling it to adjust its actions accordingly.

In step 1010, system 100 sends a message to a remote computing device. The message includes a report including a visual representation of the predefined area and the current position of the subject. This step allows real-time monitoring and visualization of the subject's location within a specific environment, making it particularly useful for tracking, security, and safety purposes. When needed (either due to an event trigger, such as a security breach or user request) the system generates a message containing a detailed report. This report includes a graphical or visual representation of the area and highlights the real-time position of the subject within that space. The representation may be similar to the diagram 1500 in FIG. 15. On the remote computing device, the report may be displayed in a user-friendly interface that allows for easy navigation and interpretation. The device may provide tools for zooming in or out on the visual representation, viewing historical movement data, or adjusting the level of detail shown on the map. Users can interact with the report to view more detailed information about specific areas or events, ensuring that they can monitor and respond to the subject's position in real-time with full contextual awareness.

In step 1015, system 100 communicates with the second self-contained devices to modify the state of the second self-contained device. The second self-contained devices may include at least the self-contained vent 130, a self-contained switch 140, and/or a thermostat. The communication between the self-contained receptacle outlets and the second self-contained devices occurs wirelessly, through the transceiver embedded in both devices. The transceiver in the self-contained receptacle in the predefined area outlet sends signals to the second self-contained device in the same predefined area, which then processes these signals to adjust its state accordingly. The two devices are synchronized within the broader power management system, allowing for seamless control and monitoring across multiple components. The communication is initiated when the system detects a change in environmental conditions, power parameters, or user input that necessitates a modification in the state of the second self-contained device. This could involve may airflow, changing lighting conditions, or altering the temperature in a specific area.

When the second self-contained device is a self-contained vent, communication with the first device (e.g., a receptacle outlet) allows the system to adjust airflow and ventilation in response to changing conditions. The self-contained vent includes the adjustable grille or louvers that can open and close to regulate air movement within a space. When motion or occupancy sensors detect that a space is occupied, the system can communicate with the vent to open, allowing fresh air or conditioned air from the HVAC system to enter the room. Conversely, if the space is unoccupied, the system may instruct the vent to close, conserving energy. If the system detects a change in temperature beyond a set threshold (from a thermostat or temperature sensors), it can send a signal to the vent to modify its state. For example, it might open to increase airflow when a room becomes too warm or close to reduce air circulation when cooling is no longer needed.

If the second self-contained device is a self-contained switch, the system uses communication to control the power supply to electrical circuits or devices connected to the switch. The switch can toggle between on, off, or energy-saving modes depending on the system's commands. This type of communication is beneficial for managing lighting, HVAC systems, or other connected appliances. The system may instruct the switch to power off certain devices or lights when motion sensors detect that a room is unoccupied. Alternatively, it may switch the power back on when someone enters the space. If the system is configured with a schedule (for example, during off-hours or low-use periods), it may send a signal to the self-contained switch to cut power to non-essential devices or lighting, reducing energy consumption when the space is not in use. The self-contained switch might also be part of a larger system that includes HVAC control. The system may send commands to adjust lighting or electrical settings based on occupancy and temperature feedback from other sensors, contributing to a holistic energy management strategy.

When the second self-contained device is a thermostat, communication enables the system to adjust temperature settings within a specific zone or room, helping to maintain comfort while optimizing energy use. The thermostat is in direct control of the HVAC system, and any changes in the thermostat settings directly influence heating, cooling, and ventilation. The system can send signals to the thermostat to raise or lower the set temperature based on occupancy, time of day, or energy-saving goals. For instance, when the system detects that a room is unoccupied, it may lower the heating or reduce the cooling to conserve energy. In a multi-zone HVAC setup, the system can communicate with different thermostats across various rooms or sections of a building. Each thermostat can adjust its respective zone based on the system's analysis of occupancy and environmental conditions. This control allows for targeted climate management, ensuring that energy is used efficiently without sacrificing comfort in occupied areas. If the system detects abnormal conditions, such as a fire or security breach, it may send commands to the thermostat to activate emergency settings, such as turning off the HVAC system to prevent the spread of smoke or controlling airflow to mitigate environmental hazards.

One example use case may be a smart office environment where multiple rooms are equipped with self-contained outlets, switches, vents, and thermostats. As employees move through the office, the system tracks their positions using motion sensors and learns patterns using the predictive analytics modules. When the system detects that someone enters a meeting room, it communicates with the self-contained vent to open and increase airflow, communicates with the thermostat to adjust the temperature to a comfortable level, and powers on the lights via the self-contained switch. Once the room is unoccupied, the system reverses these actions to conserve energy, such as closing the vent, adjusting the thermostat, and turning off the lights.

In step 1020, system 100 determines if an input power parameter is below a minimum threshold. This step begins with the power sensor embedded within the self-contained receptacle outlet, which continuously monitors multiple power parameters. The sensor is calibrated with predefined thresholds for these parameters, allowing it to detect when the power conditions fall below acceptable levels. For example, if the input voltage drops below a critical threshold due to a blackout, brownout, or another disruption, the sensor will immediately recognize this anomaly and send a signal to the outlet's processor. This signal indicates that the input power is no longer sufficient to maintain normal operation.

In step 1025, system 100 enables a power failure mode. In this mode, the outlet prepares to switch from its primary power source to the backup power supply. The processor evaluates the severity of the power drop and initiates a transition plan to ensure that the outlet can continue providing power to connected devices without interruption. This mode contributes to maintaining continuity, especially for important devices such as medical equipment, routers, security systems, or other appliances that require uninterrupted power. This mode ensures that the system can keep running even in the absence of a stable external power supply.

In step 1030, system 100 activates the independent power backup management module to supply power to the self-contained receptacle outlet. This backup management module is equipped with a dedicated power source, such as a rechargeable battery or a supercapacitor, configured to provide temporary power when the primary input source fails. The independent power backup management module allows the self-contained receptacle outlet to switch into the on-state. Upon activation, the backup management module takes over the role of supplying power to the outlet. The system ensures a smooth transition from primary power to backup power, so connected devices experience minimal to no disruption in their operation. This is important in environments where even a brief loss of power could have serious consequences, such as data loss or system shutdowns.

While the independent power backup management module is active, the system continues to monitor the input power parameters from the main supply. Once the main power source is restored, and the input parameters return to normal levels, the system automatically transitions the outlet back to its primary power source. This process is carefully managed by the processor to ensure that there is no disruption in the power supply during the transition. After switching back to primary power, the system disengages the power failure mode and stops drawing power from the backup management module. The module then enters a recharging phase, during which it restores its energy reserves to full capacity, preparing for any future power disruptions. The battery or supercapacitor used in the module is configured for quick recharging and long service life, ensuring the system is always ready for future power outages. Other forms of rechargeable power sources may be used and are within the spirit and scope of the present disclosure. The power failure mode is important in certain environments where interrupted power is problematic. Examples may include, but are not limited to, medical facilities, home security systems, data centers or IT equipment, and residential homes.

Figure 11:
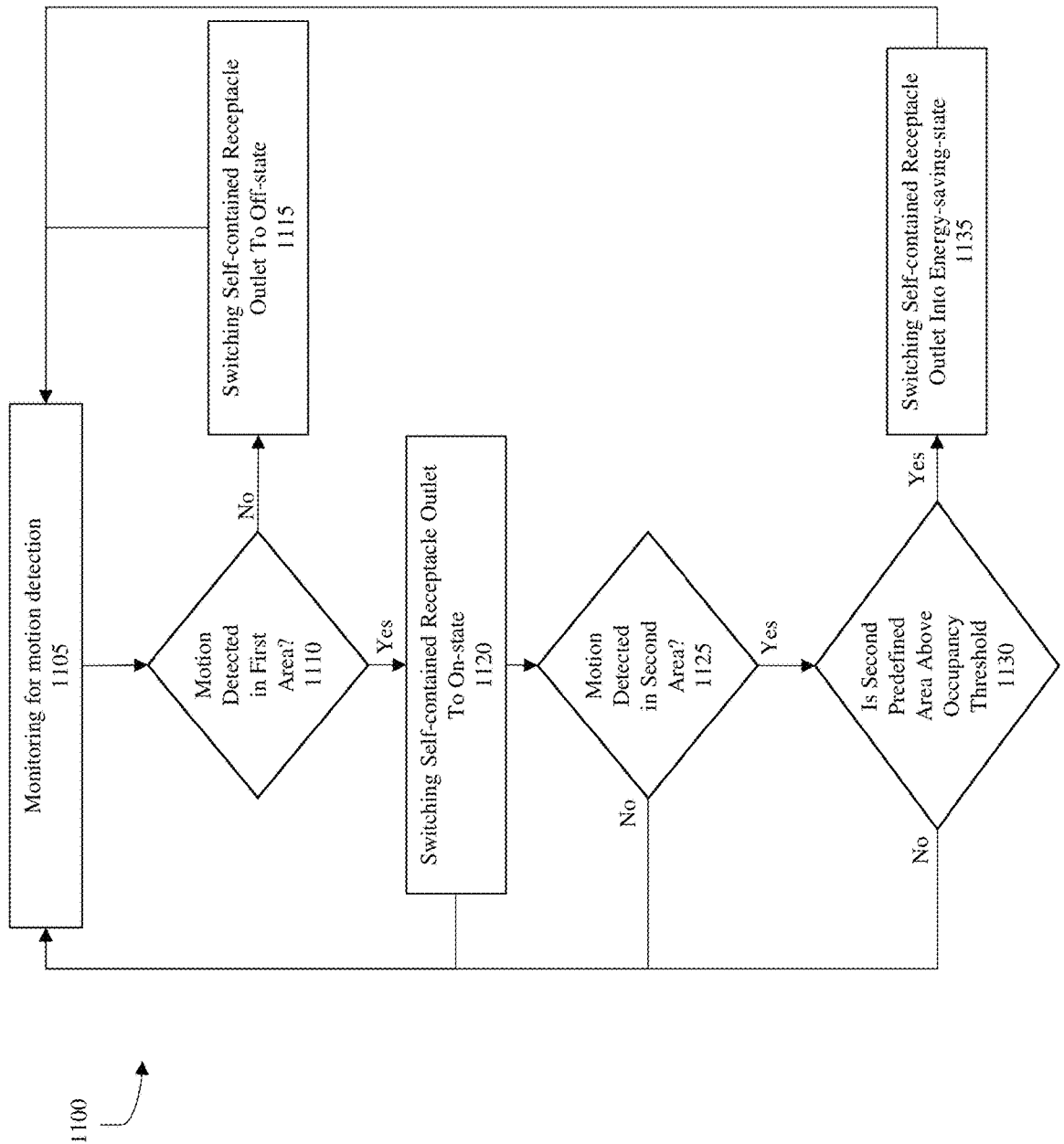
FIG. 11 is a flowchart diagram illustrating the steps for a method of predictive analytics is shown, according to an example embodiment.

With reference to FIG. 11, a flowchart diagram illustrating the steps for a method 1100 of predictive analytics is shown, according to an example embodiment. In step 1105, the motion detection module continuously monitors for motion detection. These sensors detect the presence of a person or moving object by sensing changes in infrared radiation (for PIR sensors) or changes in sound waves (for ultrasonic sensors), among other technologies. When the sensors detect motion, they send a signal to the processor in the self-contained receptacle outlet.

In step 1110, the motion detection module determines if motion has been detected using the sensors.

In step 1115, if the motion is not detected in the first predefined area, the motion detection module, along with the switching module, switches the self-contained receptacle outlet to the off-state. If no motion is detected in the first predefined area for a certain period, the system interprets this as an indication that the area is unoccupied. In the off-state, the receptacle outlet cuts power to the connected devices, preventing unnecessary energy consumption. This feature contributes to energy efficiency, as it prevents power from being wasted by devices left on in empty rooms.

In step 1120, if a motion is detected in a first predefined area, then the motion detection module, along with the switching module, switches the self-contained receptacle outlet to the on-state. When the motion detection module detects movement in the predefined area, the system interprets this as an indication that someone is present and may need to use the devices connected to the outlet. By switching to the on-state when motion is detected, the system ensures that devices are ready for use without the need for manual intervention, providing convenience and enhancing user experience.

In some embodiments, the system may include adjustable settings to fine-tune the behavior of the motion detection module and the timing for switching states. For example, the system may include a time delay between detecting the absence of motion and switching to the off-state. This ensures that the outlet doesn't immediately turn off devices if someone leaves the room temporarily. For instance, if the system detects no motion for 10 or 15 minutes, it might then switch to the off-state. The motion detection module's sensitivity may also be adjusted to detect more subtle movements or to ignore small motions, ensuring that the system responds appropriately to occupancy.

In step 1125, the predictive analytics module detects when a second predefined area is unoccupied by beings. The system uses the network of motion detection modules of the self-contained devices 120, 130, 140 installed in the second predefined area to continuously monitor human activity. The second predefined area may be a separate room, a hallway, or any designated space where the self-contained receptacle outlet controls devices like lights, appliances, or other electronic equipment.

In step 1130, the predictive analytics module determines if the probability that the second predefined area is above an occupancy threshold. The system doesn't just rely on a simple on-off signal from the motion sensors but uses an occupancy probability model to assess the likelihood that the area is occupied. The probability of occupancy is based on data from the motion sensors, environmental factors (such as time of day), and possibly historical patterns of occupancy. For example, if motion is detected frequently and consistently in the area, the system calculates a high probability that the area is occupied. If there is little or no motion over a significant period of time, the system assesses a low probability of occupancy. The system compares this occupancy probability against a predefined threshold. The threshold is a value set in the system to determine when the area should be considered unoccupied. For instance, the threshold could be set at 20%, meaning that if the system calculates that there is less than a 20% chance that the area is occupied, it will take action to conserve energy.

In step 1135, if the probability that the second predefined area is above an occupancy threshold, the predictive analytics module switches the self-contained receptacle outlet into an energy-saving-state. Once the system determines that the probability of occupancy in the second predefined area has dropped below the threshold, it signals the self-contained receptacle outlet to switch into an energy-saving-state. The energy-saving state reduces power consumption by adjusting how the outlet supplies electricity to connected devices. For instance, in an office environment, if the second predefined area is a meeting room and the system detects no motion for a set time period (e.g., 30 minutes), the probability of occupancy may drop below the threshold. In response, the system switches the outlet to the energy-saving state, turning off the room's lighting, projector, or other equipment connected to the outlet. This ensures that energy is not wasted when the room is unoccupied. The system continuously monitors the second predefined area even when the self-contained receptacle outlet is in the energy-saving state. If the sensors detect renewed motion or an increase in the probability of occupancy above the set threshold, the outlet will switch back to its normal operational state (on-state). This ensures that the outlet provides full power to connected devices as soon as the area becomes occupied again. The system may include a time delay or sensitivity adjustment to ensure that it doesn't switch prematurely into the energy-saving-state or revert to normal operation too quickly.

The predictive analytics module 435 of the self-contained receptacle outlet uses at least one algorithm, an occupancy pattern, and a historical power usage data set collected from the power sensor to predict a future power consumption and adjust a power state of the power receptacle based on the subset power mode. These algorithms can include machine learning techniques, statistical models, or rule-based systems that help the module analyze patterns in the usage of connected devices and power consumption trends, detect correlations between occupancy, time of day, and power usage, and predict future energy demands based on previous behaviors and current conditions. For instance, the algorithm may learn that certain devices are typically powered on at specific times, such as during business hours, and adjust power availability accordingly. Additionally, it can factor in real-time inputs like changes in occupancy or environmental conditions to fine-tune its predictions. Occupancy pattern data is collected from motion sensors or other occupancy detection systems that monitor when a space is occupied or vacant. By analyzing the historical and real-time occupancy data, the module can understand the typical patterns of use within a room or area. These occupancy patterns allow the system to proactively adjust power availability, ensuring that energy is supplied when needed and conserved when the space is empty. The historical power usage data set, collected from the outlet's power sensor, provides valuable insight into how much energy various devices have consumed over time. This dataset includes information on the power draw of connected devices at different times, the frequency and duration of usage for each device, and the power consumption trends across different days, weeks, or seasons. By analyzing this data, the predictive analytics module can identify recurring patterns in power usage. For example, if the power sensor indicates that a connected device consistently draws more power during specific hours of the day or certain days of the week, the module can use this information to predict when future power consumption will likely increase.

Using the algorithm, occupancy patterns, and historical power usage data, the predictive analytics module can make accurate predictions about future power needs. For example, it might predict that during the hours when occupancy is low, the power consumption of connected devices will decrease. It could anticipate that during high-use periods, such as when an office is in full operation, the power draw will increase significantly. The module uses this prediction to adjust the power receptacle's state in advance, ensuring that energy is available when required but minimized during low-demand times.

The system maintains occupancy awareness using predictive presence tracking based on prior detected motion patterns, even when the individual moves out of the direct view of any single sensor. Predictive presence tracking is an advanced algorithmic technique that models likely occupant behavior based on past movement patterns and real-time motion data. The system gathers information from multiple sensors. Over time, these sensors collect data about how individuals typically move through the monitored space, capturing details about typical movement paths within a room or across areas, time-based activity patterns, like daily routines or high-occupancy periods, and patterns of dwelling in certain areas, such as how long someone usually stays in a specific room. This accumulated data allows the system to create a behavioral map of common occupancy patterns within the space, forming the basis for predictive tracking.

When a person enters an area, the sensors detect motion and provide the system with real-time data on their position. If the individual moves out of the range of direct sensor detection (such as moving around a corner, stepping into an area not covered by sensors, or standing still in an out-of-view location) the system can use previously detected motion patterns to predict where the person is likely to be, maintaining occupancy awareness. For example: the system can anticipate movement paths and estimate dwell time. If a person typically walks from the living room to the kitchen around a particular time, and motion is detected initially in the living room, the system can predict that the individual will likely move toward the kitchen even when the individual leaves the direct line of sight of the living room sensor. If an occupant frequently pauses in a specific area (such as a desk or kitchen island) for a set amount of time, the system can assume they are likely still present, even without continuous detection. To track occupancy even when an individual is out of a sensor's direct view, the system applies predictive models that account for movement patterns, area transitions, and typical behaviors. These models may incorporate time-based prediction, location-based probability, and zone-specific instructions. For instance, if the system detects a person entering a room and subsequently loses direct sensor contact, it can rely on the probability that the person is still within the room or has transitioned to an adjacent, commonly accessed area. The predictive tracking system can also utilize sensor fusion, combining input from various types of sensors to enhance its predictions. By combining these inputs, the system strengthens its prediction accuracy and can maintain a more comprehensive awareness of occupancy. Predictive presence tracking provides improved energy efficiency, enhanced user comfort, and reduced sensor dependency.

Figure 12:
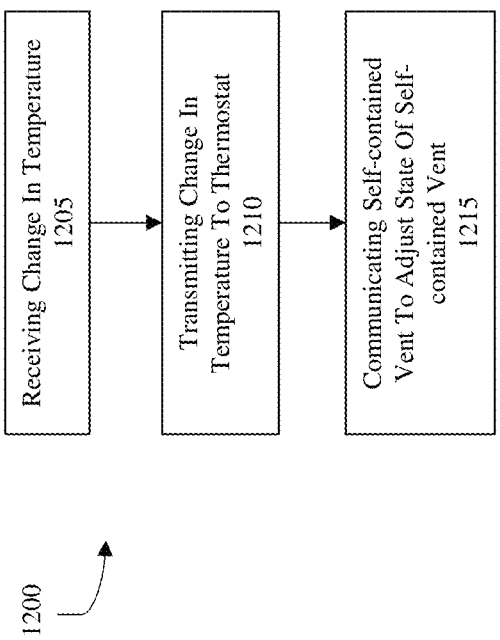
FIG. 12 is a flowchart diagram illustrating the steps for a method of the communication between a self-contained switch and the associated self-contained vents, according to an example embodiment.

With reference to FIG. 12, a flowchart diagram illustrating the steps for method 1200 of the communication between a self-contained switch and the associated self-contained vents is shown, according to an example embodiment. Method 1200 begins with step 1205, wherein system 100 receives a change in temperature on the user interface. In some embodiments, the change in temperature is initiated by the predictive analytics module. This interface, similar to the interface on display 705, may be a touchscreen or a physical button-based display, with the temperature information shown in an easily understandable format, such as degrees Celsius or Fahrenheit. This step starts when the user interacts with the user interface by either tapping the display (if it's a touchscreen like display 705) or pressing physical buttons to adjust the temperature. For example, the user may press an "up" arrow to increase the temperature or a "down" arrow to decrease it. Alternatively, on a slider interface, the user may slide their finger to adjust the temperature to the desired setpoint.

The system detects the user's input through the touch-sensitive interface or button controls and registers the requested temperature change. The system captures this input in real time, and the processor within the self-contained switch or thermostat processes the change. As soon as the input is detected, the display on the user interface updates immediately to reflect the new setpoint.

In step 1210, the processor or second processor, using the transceiver, transmits a signal, including the change in temperature, to the thermostat. When the thermostat receives the transmitted signal, it decodes the information and identifies the new temperature setpoint. If the new temperature setpoint requires heating, the thermostat will signal the HVAC system to activate the heating elements, such as a furnace or heat pump. Similarly, if cooling is required, the thermostat will instruct the HVAC system to activate the air conditioning or ventilation systems to lower the temperature.

In step 1215, system 100 communicates with the self-contained vent to adjust a state of the self-contained vent. Once a trigger (e.g. temperature change, occupancy detection, and/or changes in air quality) is detected, the system sends a signal to the self-contained vent. The signal sent to the self-contained vent contains instructions that detail the required adjustment. For example, the signal may indicate opening of the vent, closing of the vent, or partial adjustment. Upon receiving the signal, the self-contained vent uses its internal motorized mechanism, such as, but not limited to, a motor or linear actuator, to adjust its state of the grilles and louvers according to the command. The vent's adjustment is managed by the second processor embedded within the self-contained vent.

If the system requests the vent to open fully, the motorized louvers will move to allow maximum airflow, enhancing ventilation or cooling. If the system requests the vent to close, the louvers will shut, stopping airflow to the room and conserving energy. For partial openings, the system might request the vent to open by a certain percentage, optimizing airflow while maintaining energy efficiency. For example, the vent could open halfway to balance temperature while minimizing energy consumption. The self-contained vent can continue to adjust its state dynamically based on further input from the system. For instance, as temperature or occupancy conditions change, the system can send additional commands to fine-tune the vent's position. If a room begins to cool down too much after the vent has been closed, the system can signal the vent to reopen slightly to balance the temperature.

In other examples, if the thermostat detects that a room is too warm, it may send a signal to the vent to open and allow cool air to circulate. If the room reaches the desired temperature, the thermostat can send another signal to the vent to close or reduce airflow, maintaining the temperature without overusing energy. If a room becomes vacant, the system may communicate with the self-contained vent to close, preventing unnecessary ventilation. Conversely, when a room becomes occupied again, the vent can be instructed to reopen to ensure that air is circulated for the comfort of the occupants. In some systems, the self-contained vent may also communicate with sensors that measure air quality or humidity. If air quality deteriorates or humidity rises beyond a certain threshold, the sensors can send data to the central system, which then instructs the vent to open and increase ventilation, improving air circulation and maintaining healthy indoor air conditions. By dynamically adjusting the vent's state based on real-time data, the system prevents unnecessary heating, cooling, or ventilation in unoccupied or stable environments. This reduces overall energy consumption, leading to cost savings and a smaller environmental footprint. For example, in a smart home setup, if the self-contained vent is located in a room that is not used frequently, the system can automatically keep the vent closed to prevent energy waste. If the room is in use for a short period, the system can temporarily open the vent and then close it once the room is vacated.

Figure 13:
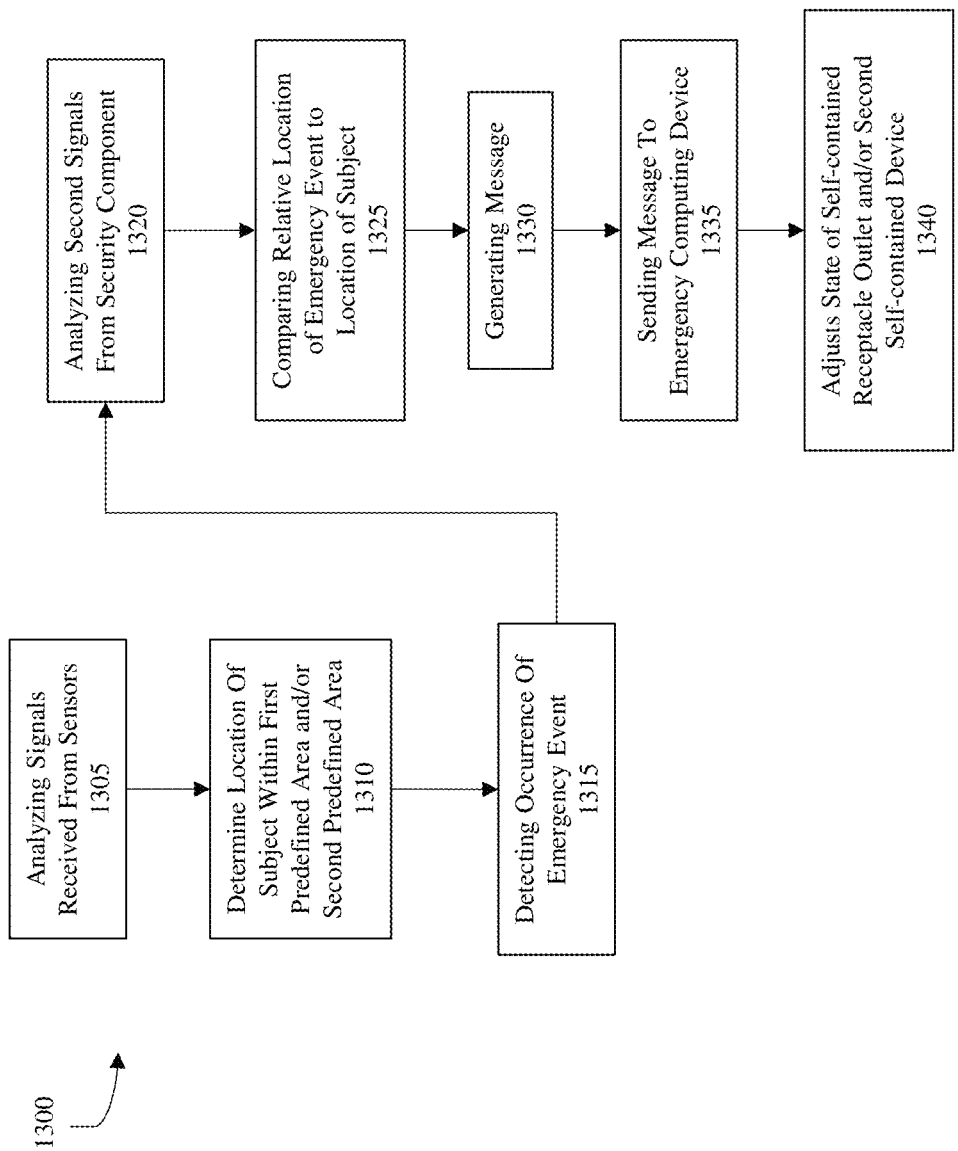
FIG. 13 is a flowchart diagram illustrating the steps for a method of emergency event detection and response, according to an example embodiment.

With reference to FIG. 13, a flowchart diagram illustrating the steps for a method 1300 of emergency event detection and response is shown, according to an example embodiment. In step 1305, system 100, using the processor of the self-contained receptacle outlet and/or the second processor of the second self-contained device, analyzes a plurality of signals received from the plurality of sensors. The first predefined area may be a specific room where a set of self-contained devices are located, while the second predefined area could be another room monitored by another set of self-contained devices. In step 1310, the processor and/or the second processors then determine a location of a subject within a first predefined area and/or a second predefined area. The processor of the self-contained receptacle outlet or the second processor of the second self-contained device is responsible for gathering and analyzing the signals from these multiple sensors. The processor continuously receives data about motion, presence, or other environmental conditions from each sensor, and it uses this data to determine where the subject is located within the predefined areas.

The processor uses the data gathered from the plurality of sensors to triangulate the subject's location within one or both of the predefined areas. The processor can use the timing of when each sensor detects movement or presence to help determine where the subject is located in relation to the sensors. The strength of the signal detected by each sensor can indicate how close or far the subject is from each sensor. For example, if one motion sensor detects a strong signal while another sensor detects a weaker signal, the processor can deduce that the subject is closer to the first sensor. If the subject moves through the predefined areas, the sensors can detect movement patterns that indicate a trajectory. The processor uses these patterns to follow the subject's movements in real-time, determining their path across the areas. By analyzing this information, the processor can determine the precise location of the subject within the predefined area, whether they are moving or stationary. This information contributes to the system's automation and energy management functions, as it enables the system to dynamically adjust its behavior based on real-time data about where the subject is located.

In step 1315, at least one security component detects an occurrence of an emergency event. The security component detection module includes various sensors specifically designed to monitor for emergency events. These sensors may include, but are not limited to, smoke detectors, heat sensors, motion sensors, and glass break sensors. These sensors are strategically placed in different areas to provide coverage for all predefined areas, ensuring that any signs of an emergency are detected quickly. When an emergency event occurs, the sensors in the security component detection module send signals to either the processor in the self-contained receptacle outlets or the second processor in the second self-contained devices.

In step 1320, system 100 analyzes a second plurality of signals from the at least one sensor of the security component to determine a relative location of the occurrence of the emergency event within the first predefined area and/or the second predefined area. The processors analyze the timing, intensity, and location of the signals from the various sensors. By cross-referencing this data, the processor can determine the exact or relative location of the emergency. For example, if multiple smoke detectors trigger in different rooms, the processor can analyze which sensor triggered first and determine the location of the fire. If a motion sensor detects movement near a door, followed by a glass break sensor detecting a break-in, the processor can triangulate the position of the intruder within the predefined area. The processor may also consider factors like how many sensors are detecting the event, how quickly the event is spreading (in the case of fire), or the direction of movement (in the case of an intruder).

The processor uses the sensor data to pinpoint the relative location of the emergency event. For instance, if the event occurs within the first predefined area, such as a room monitored by the self-contained receptacle outlet, the processor can determine if the fire or break-in is occurring near a particular sensor in that area. Similarly, if the event occurs in the second predefined area, such as a hallway or adjacent room monitored by the second self-contained device, the processor can locate the exact spot within that area. The relative location refers to how close the emergency event is to key points within the monitored environment. For example, the system might detect that smoke is concentrated near a particular window, suggesting that the fire started in that section of the room. A motion sensor might indicate that an intruder has moved through a specific part of a building.

In step 1325, upon detecting the emergency event, the processor and/or the second processor compares the relative location of the emergency event to the location of the subject. Once both the relative location of the emergency event and the location of the subject have been determined, the processor compares the two locations. If the subject is located close to the emergency, such as near a fire or break-in point, the system will treat the situation with urgency and take appropriate actions to protect the subject. If the subject is located far from the emergency, the system will adjust its response accordingly, focusing on containment and notifying relevant parties while ensuring the subject's safety in another area. This comparison allows the system to assess the risk to the subject and prioritize actions based on the severity and proximity of the threat.

Figure 17A:
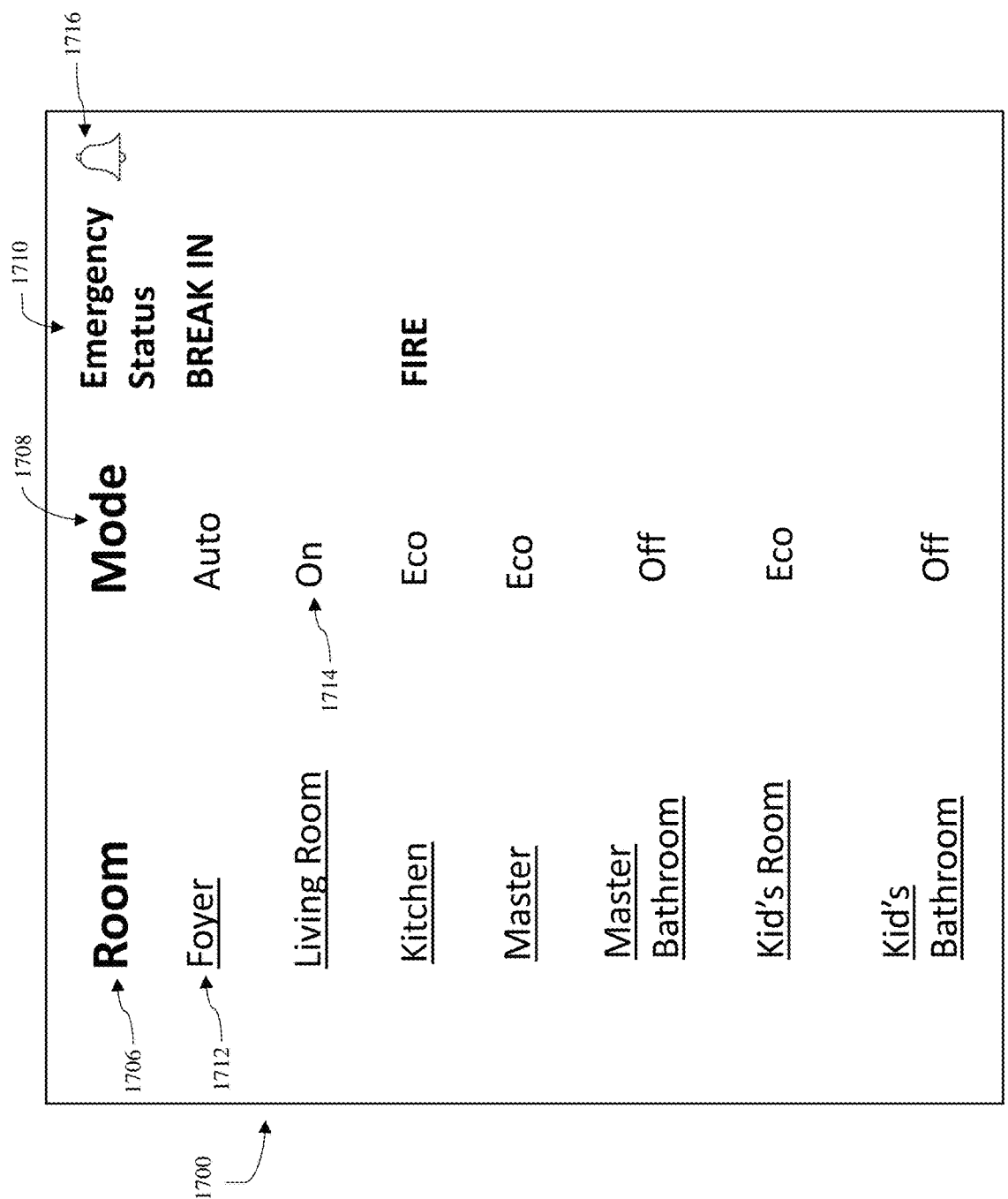
FIG. 17A illustrates a second user interface configured for the display of the remote controller, according to an example embodiment.
Figure 17B:
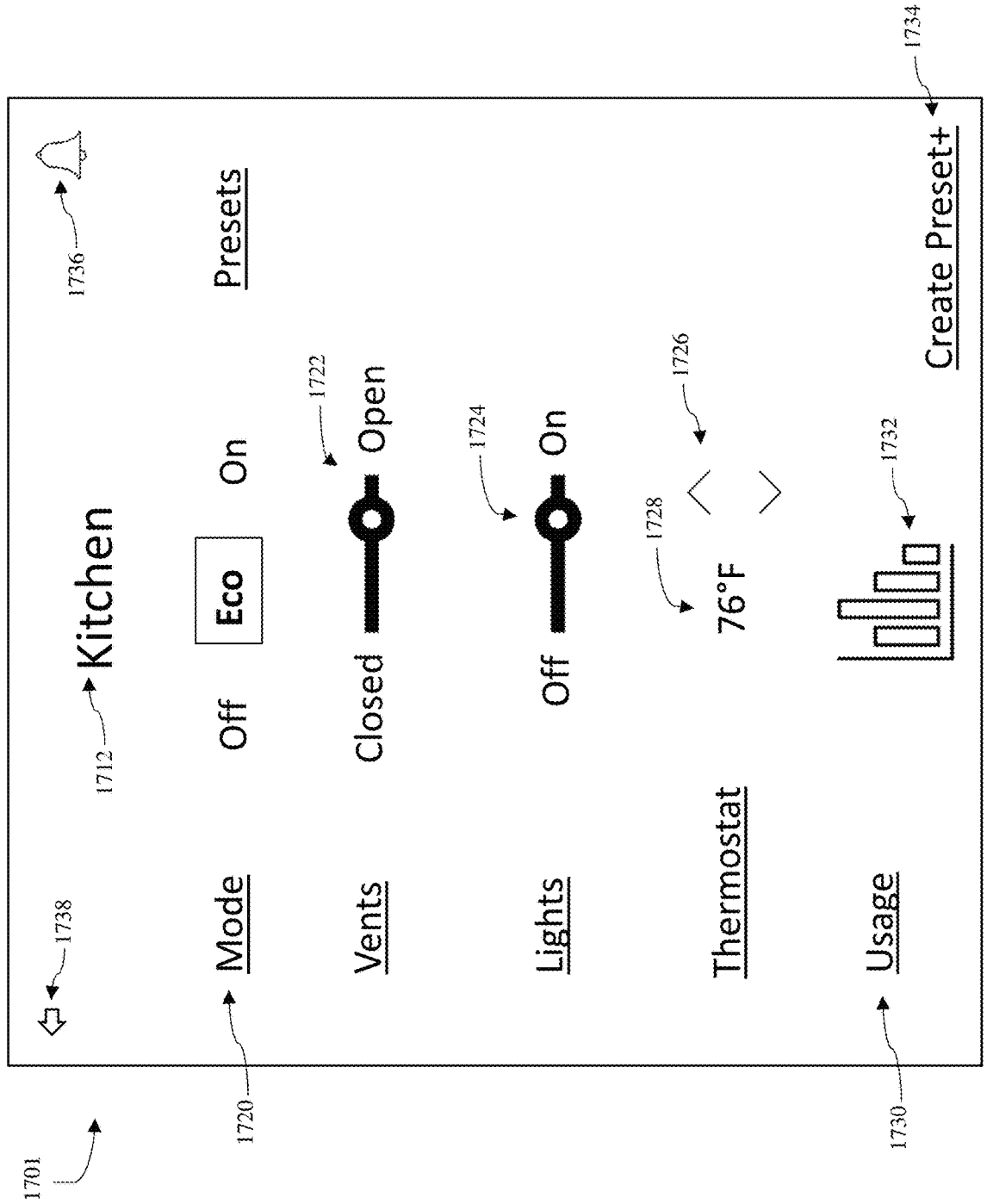
FIG. 17B illustrates a second user interface configured for the display of the remote controller, according to an example embodiment.
Figure 17D:
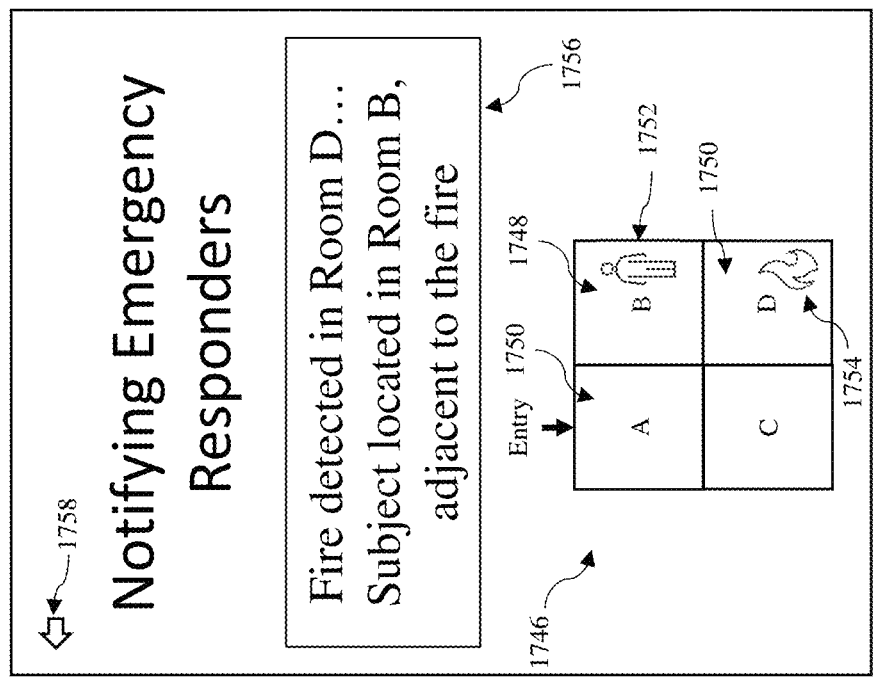
FIG. 17D illustrates a notification user interface for the emergency event configured for the display of the remote controller, according to an example embodiment.
Figure 17C:
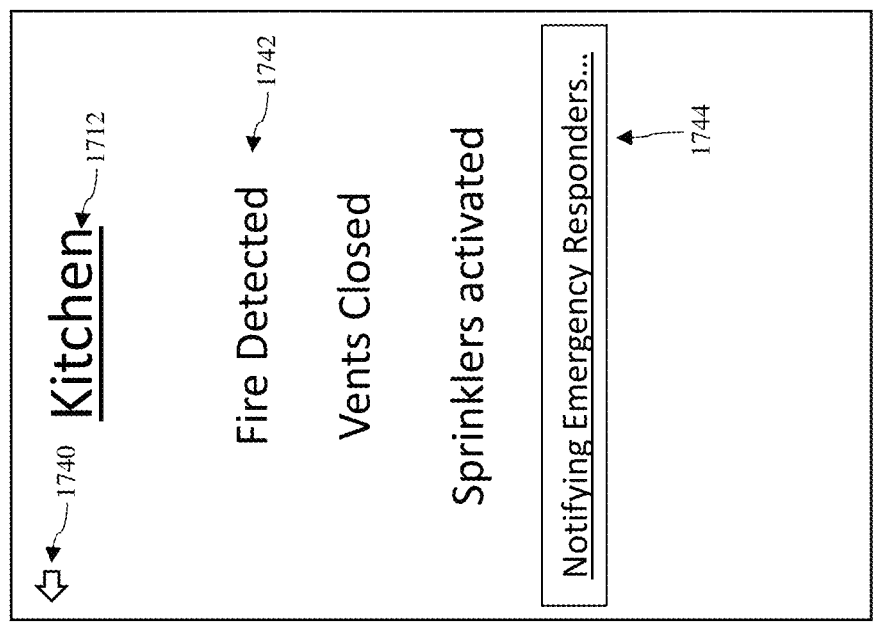
FIG. 17C illustrates a notification user interface for an emergency event configured for the display of the remote controller, according to an example embodiment.

With additional reference to FIGS. 17C and 17D, second user interfaces 1702 and 1703, respectively, configured for the display of the remote controller is illustrated, according to an example embodiment. After detecting the location of an emergency event, the system sends interface 1702 to the remote controllers of the system. Interface 1702 is configured to be a pop-up interface to urgently notify the user. The pop-up interface may configured to create sound alerts on the remote controller. Interface 1702 includes the room name 1712 and the back button 1740 configured to display interface 1701.

In step 1330, after comparing the relative location of the emergency event to the location of the subject, the processor and/or the second processor generates a message. The message sent to the emergency computing device includes a report. Interface 1702 further includes the system's configured reactions 1742 to the emergency event and an emergency report button 1744 that is configured to display interface 1703, which displays the report sent to emergency responders. The report displayed in interface 1703 includes a visual representation 1746 of the first predefined area 1748, the second predefined area 1750, the location of the subject 1752 (e.g., "Subject located in Room B, adjacent to the fire"), and the relative location 1754 of the emergency event (e.g., "Fire detected in Room A," or "Intruder detected near north exit"). Other contextual data, such as the type of emergency (fire, break-in, etc.), the severity of the event, and the areas that are affected may be included in a text box 1756 or other visual representation and are within the spirit and scope of the present disclosure. Interface 1703 includes the back button 1758 configured to display interface 1702.

In step 1335, the processor and/or the second processor send the message to an emergency computing device, which may be a fire control system, a security monitoring center, emergency responders (such as fire services or law enforcement), and/or a building management system.

In step 1340, the processor and/or the second processor adjusts a state of the self-contained receptacle outlet and/or the second self-contained device. The processor may switch the outlet to an off-state to cut power to certain devices and reduce the risk of electrical fires or other hazards. Alternatively, if emergency devices (such as alarms or communication systems) are connected to the outlet, the processor may keep it in the on-state to ensure those devices remain powered. If the second self-contained device is a vent, the system might close or adjust the vent to prevent the spread of smoke or hazardous fumes during a fire. Similarly, if the second device is a self-contained switch, it could be used to cut power to certain circuits to prevent additional risks, or it could activate emergency lighting. In the case of HVAC systems, the processor might communicate with vents or thermostats to control air circulation, ensuring that smoke does not spread or that rooms near the emergency remain ventilated.

By example, a fire is detected in Room A, and the subject is in Room B, which is adjacent. Upon detecting the fire through the smoke detectors in Room A, the processor identifies the fire's location. At the same time, the motion detection module confirms the subject's presence in Room B. The processor compares these locations and determines that the subject is in immediate proximity to the fire. The system then generates and sends a message to the building's emergency computing device, reporting that there is a fire in Room A and that the subject is in Room B, providing important information to emergency responders. The system also adjusts the state of the self-contained devices. The system cuts power to the self-contained receptacle outlets in Room A to reduce the risk of electrical fires. The vents in Room B are closed to prevent smoke from entering, while ensuring the lights remain on to guide the subject safely out.

Figure 14:
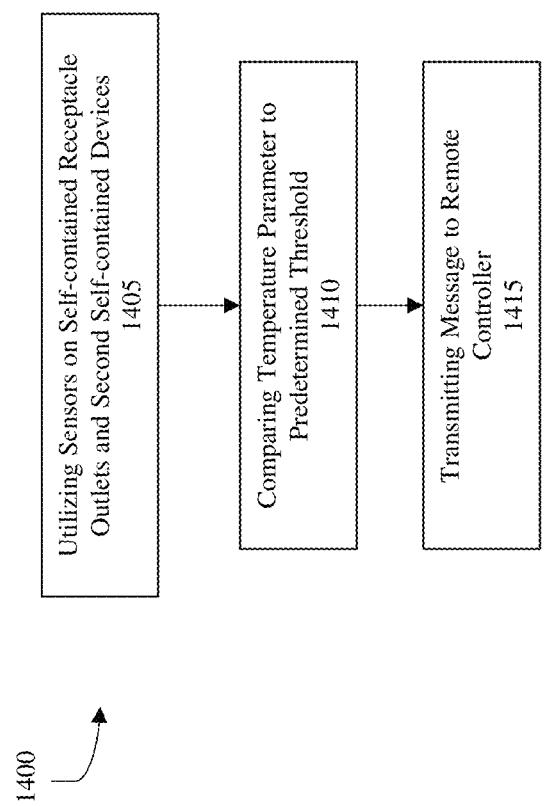
FIG. 14 is a flowchart diagram illustrating the steps for a method of a suggestion mode for optimizing efficiency, according to an example embodiment.
Figure 17E:
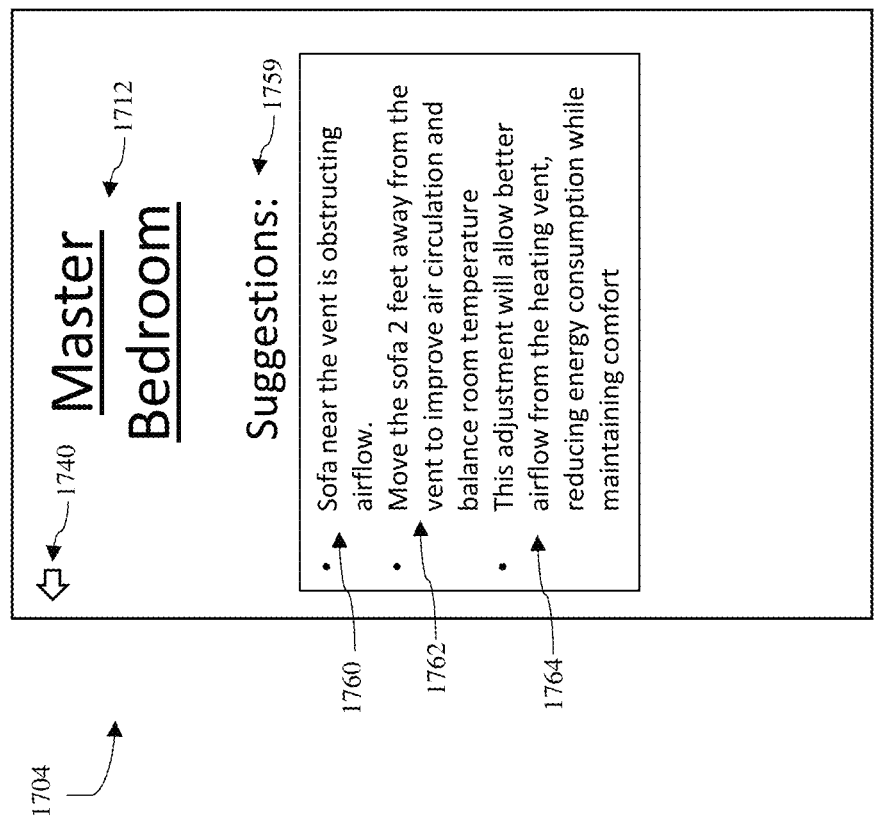
FIG. 17E illustrates a notification user interface for a suggestion mode configured for the display of the remote controller, according to an example embodiment.

With reference to FIGS. 14 and 17E, the suggestion mode will be discussed. FIG. 14 is a flowchart diagram illustrating the steps for a method 1400 of a suggestion mode for optimizing efficiency for system 100 is shown, according to an example embodiment. FIG. 17E illustrates a notification user interface 1704 for the suggestion mode, according to an example embodiment. In step 1405, the suggestion mode utilizes sensors on the self-contained receptacle outlet and/or the second self-contained device to analyze objects within a first predetermined area and a temperature parameter. Using data from the various sensors, the system analyzes how these factors interact to impact energy usage, particularly in relation to temperature control and power consumption. This mode operates autonomously to optimize both energy efficiency and the performance of connected devices, offering suggestions or taking action to improve the overall energy profile of the space. In the first predetermined area, the system uses its sensors to detect and analyze a variety of objects that could influence energy efficiency. These objects may include furniture or equipment that could obstruct airflow from vents, block natural lighting, or interfere with the optimal placement of heating or cooling devices. The objects may also include electrical devices that are plugged into the self-contained receptacle outlet or controlled by the second self-contained device, such as lighting systems, heaters, fans, or electronic appliances. The system also evaluates the positions and interactions of these objects in relation to the environment. For example, if a piece of furniture is placed in front of a heating vent, blocking airflow, the system can identify this as an issue affecting temperature control and efficiency.

In step 1410, the suggestion mode compares, using the processor and/or the second processor, the temperature parameter to a predetermined threshold. The temperature parameter refers to real-time data collected by sensors within the system that measure the ambient temperature in the first predefined area. These sensors continuously monitor the room's temperature and feed this data to the processor. The system is configured with a predetermined threshold, which represents the ideal temperature range for the space based on user preferences, energy efficiency goals, or environmental comfort needs. The processor or second processor compares the current temperature to this threshold to determine whether the temperature falls within the desired range. For instance, the threshold might be set at 22° C. for a comfortable indoor climate during winter, or it could be set at 26° C. to optimize energy savings during the summer.

If the system detects that the temperature parameter deviates from the predetermined threshold (either too high or too low) the suggestion mode is activated. This deviation could occur due to factors such as obstructed airflow, poor insulation, and misplacement of devices. An object, such as furniture or equipment, might be blocking the flow of heated or cooled air from a vent, causing uneven temperature distribution. Objects like curtains or shades that are not positioned correctly could allow excessive heat to enter or escape. Electronics or lighting fixtures may be generating excess heat near temperature-sensitive areas, raising the ambient temperature above the desired threshold.

In step 1415, the suggestion mode transmits a message to a remote computing device to adjust a position of an object of the plurality of objects to modify the temperature parameter to satisfy the predetermined threshold. After analyzing the object placement and identifying potential issues, the system generates a message recommending corrective action. The message is configured to be displayed on at least the display of the remote computing devices (or remote controllers) and the display of the self-contained devices, such as outlet 120 and/or switch 140. The message provides a specific suggestion 1759 to adjust the position of an object to modify the temperature and bring it back within the desired range. Shown in FIG. 17E, the message may include identification of the object 1760, recommended action 1762, and reasoning 1764. The system specifies which object is causing the temperature issue (e.g., "Sofa near the vent is obstructing airflow"). The system suggests repositioning or adjusting the object (e.g., "Move the sofa 2 feet away from the vent to improve air circulation and balance room temperature"). The message might include an explanation of how the object is affecting the temperature and why the adjustment will help (e.g., "This adjustment will allow better airflow from the heating vent, reducing energy consumption while maintaining comfort"). The user may follow the system's suggestion by adjusting the position of the identified object. Once the object is repositioned, the system's sensors monitor the temperature parameter in real-time to confirm that the adjustment has achieved the desired effect. The temperature should stabilize within the predetermined threshold, improving both comfort and energy efficiency.

Figure 16:
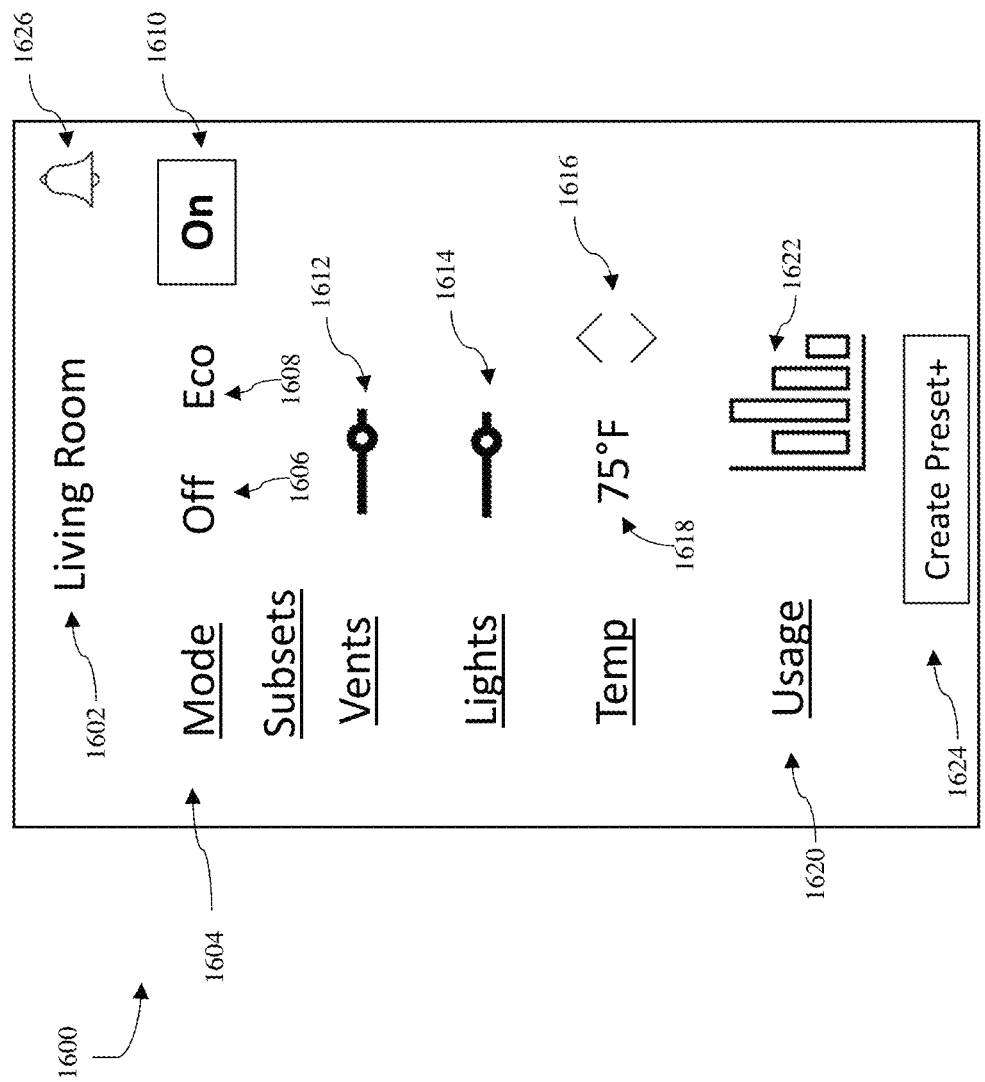
FIG. 16 illustrates a user interface configured for the display of the self-contained receptacle outlet, according to an example embodiment.

Referring now to FIG. 16, a user interface 1600 configured for the display of the self-contained receptacle outlet is illustrated, according to an example embodiment. User interface 1600 displays the name 1602 of the predefined area that the self-contained receptacle outlet is located in. User interface also includes a mode section 1604 in which the user may select a certain mode. The modes include off-state 1606, energy-saving state 1608, and on-state 1610. Interface 1600 further includes slider 1612 for the vents in the same room. The slider can be interacted with to signal to the system to open, close, or partially open the vents. Interface 1600 further includes slider 1614 for the lights in the same room. The slider can be interacted with to signal to the system to turn off, turn on, or dim the lights. Interface 1600 also includes buttons 1616 that can be interacted with to change the temperature 1618 of the room. Interface 1600 displays the usage metrics section 1620 along with a graphical representation 1622 of the measurements of the power parameters. Interface 1600 further displays a create preset button 1624 that, when interacted with, automatically creates a subset mode based on the current room configuration shown in the outlet display. The system may automatically assign a name (e.g. "Preset 1", "Preset 2", etc.) for the subset mode that can be edited later, such as through the remote controller. In some embodiments, when interacting with preset mode button. The interface also includes a notification button that can be interacted with. After interacting with the notification button 1626, the outlet display may show messages and alerts sent by the system.

Referring now to FIG. 17A, a second user interface 1700 configured for the display of the remote controller is illustrated, according to an example embodiment. Interface 1700 displays a room section 1706 including a column of names for predefined areas or rooms. Interface 1700 displays a mode section 1708 including a column of states 1714 for each named predefined area or room. Interface 1700 further displays an emergency section 1710 including a column of ongoing emergencies for each named predefined area or room. The interface also includes a notification button 1716. After interacting with the notification button, the outlet display may show messages and alerts sent by the system.

Referring now to FIG. 17B, a second user interface 1701 configured for the display of the remote controller is illustrated, according to an example embodiment. After interacting with a room name under the room section 1706 in interface 1700, the remote controller displays interface 1701 which includes information and possible actions associated with said room name. Interface 1701 is similar to interface 1600. User interface 1701 displays the name 1712 of the selected room. Interface 1701 also includes a mode section 1720 in which the user may select a certain mode. The modes include the off-state, energy-saving state ("ECO"), and on-state. Interface 1701 further includes slider 1722 for the vents in the same room. The slider can be interacted with to signal to the system to open, close, or partially open the vents. Interface 1701 further includes slider 1724 for the lights in the same room. The slider can be interacted with to signal to the system to turn off, turn on, or dim the lights. Interface 1701 also includes buttons 1726 that can be interacted with to change the temperature 1728 of the room. Interface 1701 displays the usage metrics section 1730 along with a graphical representation 1732 of the measurements of the power parameters. Interface 1701 further displays a create preset button 1734 that, when interacted with, automatically creates a subset mode based on the current room configuration shown in the outlet display. The system may automatically assign a name (e.g. "Preset 1", "Preset 2", etc.) for the subset mode that can be edited later, such as through the remote controller. In some embodiments, when interacting with preset mode button, the system displays an interface configured to allow the user to input specific parameter values for the subset mode. The interface 1701 also includes a notification button that can be interacted with. After interacting with the notification button 1736, the outlet display may show messages and alerts sent by the system. Interface 1701 further displays a back button 1738 configured to display interface 1700.

Figure 19:
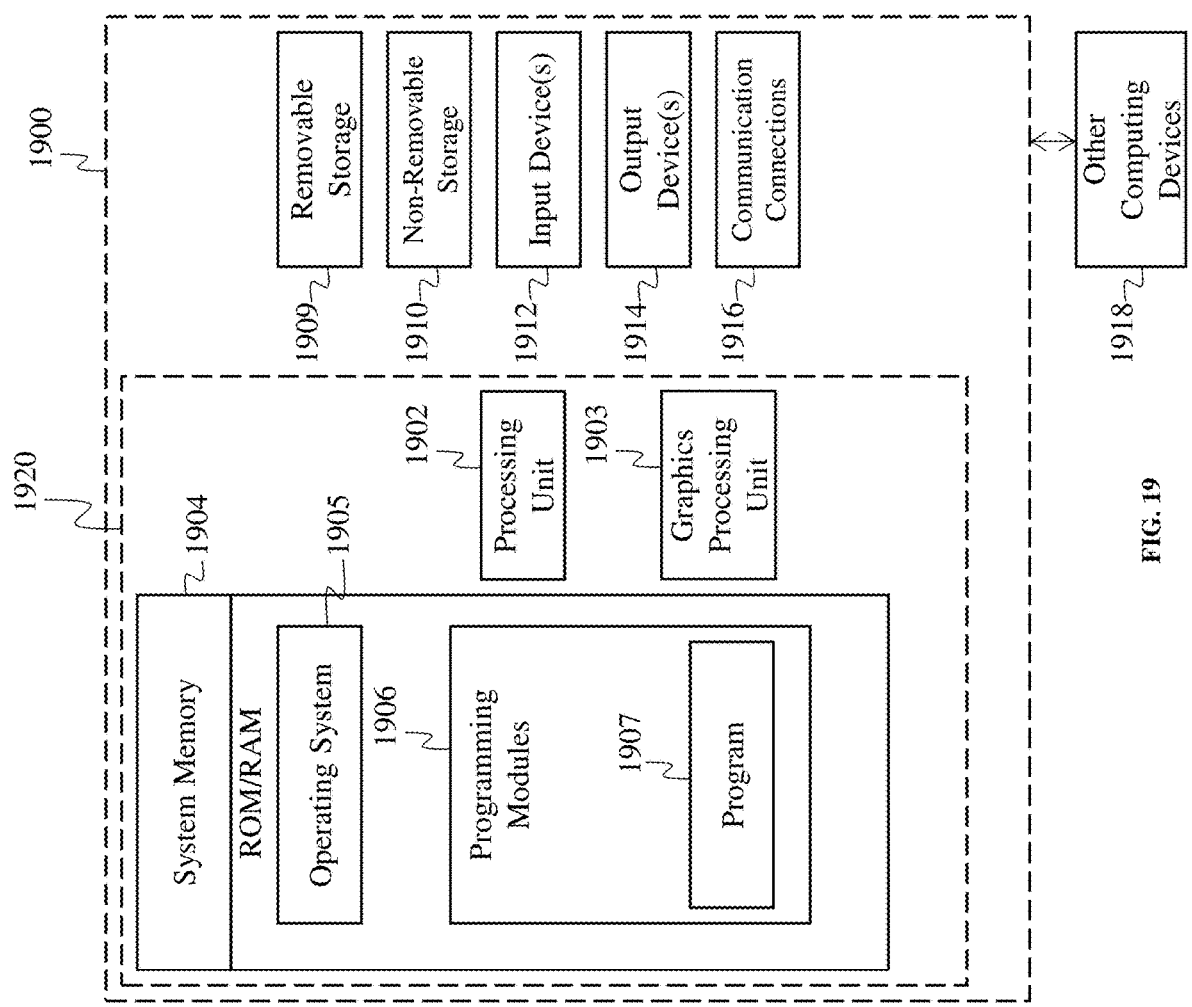
FIG. 19 is a block diagram of a system including an example computing device and other computing devices, according to an example embodiment.

FIG. 19 is a block diagram of a system including an example computing device 1900 and other computing devices. Consistent with the embodiments described herein, the aforementioned actions performed by server 102 or devices 112, 130, 140, and 150 may be implemented in a computing device, such as the computing device 1900 of FIG. 19. Any suitable combination of hardware, software, or firmware may be used to implement the computing device 1900. The aforementioned system, device, and processors are examples and other systems, devices, and processors may comprise the aforementioned computing device. Furthermore, computing device 1900 may comprise an operating environment for the methods shown in FIGS. 9 through 14 above.

With reference to FIG. 19, a system consistent with an embodiment of the invention may include a plurality of computing devices, such as computing device 1900. In a basic configuration, computing device 1900 may include at least one processing unit 1902 and a system memory 1904. Depending on the configuration and type of computing device, system memory 1904 may comprise, but is not limited to, volatile (e.g., random access memory (RAM)), nonvolatile (e.g., read-only memory (ROM)), flash memory, or any combination or memory. System memory 1904 may include operating system 1905, one or more programming modules 1906 (such as program module 1907). Operating system 1905, for example, may be suitable for controlling computing device 1900's operation. In one embodiment, programming modules 1906 may include, for example, a program module 1907. Furthermore, embodiments of the invention may be practiced in conjunction with a graphics library, other operating systems, or any other application program and is not limited to any particular application or system. This basic configuration is illustrated in FIG. 1900 by those components within a dashed line 1920.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and nonvolatile, removable, and non-removable media implemented in any method or technology for storage of information, such as computer readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 1900. Any such computer storage media may be part of device 1900. Computing device 1900 may also have input device(s) 1912 such as a keyboard, a mouse, a pen, a sound input device, a camera, a touch input device, etc. Output device(s) 1914 such as a display, speakers, a printer, etc. may also be included. The aforementioned devices are only examples, and other devices may be added or substituted.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acous-tic, radio frequency (RF), infrared, and other wireless media. The term computer readable media as used herein may include both computer storage media and communication media.

As stated above, a number of program modules and data files may be stored in system memory 1904, including operating system 1905. While executing on processing unit 1902, programming modules 1906 may perform processes including, for example, one or more of the methods shown in FIGS. 9 through 14 above. Computing device 1900 may also include a graphics processing unit 1903, which supplements the processing capabilities of processor 1902 and which may execute programming modules 1906, including all or a portion of those processes and methods shown in FIGS. 9 through 14 above. The aforementioned processes are examples, and processing units 1902, 1903 may perform other processes. Other program-ming modules that may be used in accordance with embodi-ments of the present invention may include electronic mail and contacts applications, word processing applications, spreadsheet applications, database applications, slide presentation applications, drawing or computer aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including handheld devices, multiprocessor systems, microprocessor based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A communication-enabled power management system comprising:
   a self-contained receptacle outlet comprising:
      a housing;
      a power receptacle on a front face of the housing;
      a power sensor configured to monitor a plurality of power parameters;
      a transceiver within the housing;
      a switching module coupled to the housing configured to allow a user to selectively control a flow of electrical power to a connected electrical device by switching between an on-state, where a power is provided, and an off-state, where the power is not provided;
      a motion detection module coupled to the housing configured such that if a motion is detected in a first predefined area, then switching the self-contained receptacle outlet to the on-state, and if the motion is not detected in the first predefined area, then switching the self-contained receptacle outlet to the off-state;
      an independent power backup management module coupled to the housing configured to allow the self-contained receptacle outlet to switch into the on-state if at least one power parameter of the plurality of power parameters fails to satisfy a power parameter threshold;
      a predictive analytics module coupled to the housing configured to detect when a second predefined area is unoccupied by beings and if a probability that the second predefined area is above an occupancy threshold, then switching the self-contained receptacle outlet into an energy-saving-state;
   a display on the front face of the housing having a user interface on an outward face on the front face of the self-contained receptacle outlet configured to display the at least one power parameter of the plurality of power parameters;
   a button on the front face of the housing to toggle the at least one power parameter that is displayed on the user interface;
   a processor coupled to the housing and having a unique identifier, the processor configured for:
      connecting the self-contained receptacle outlet to a remote controller using the unique identifier;
      transmitting a second user interface to the remote controller to be displayed on the remote controller, wherein the second user interface comprises:
         the plurality of power parameters; and
         a mode-toggle for switching the self-contained receptacle outlet between the on-state, the off-state, and the energy-saving-state;
      receiving a signal from the remote controller to switch the self-contained receptacle outlet to at least one of the on-state, the off-state, and the energy-saving-state;
      switching the self-contained receptacle outlet to at least one of the on-state, the off-state, and the energy-saving-state based on the signal received; and
      sending a message to the remote controller when a change in the at least one power parameter is detected.

2. The communication-enabled power management system of claim 1, further comprising a second self-contained device comprising at least one of: (i) a self-contained vent, (ii) a self-contained switch, wherein the self-contained vent and the self-contained switch each comprise a second motion detection module, and a (iii) a security component comprising a security component detection module.

3. The communication-enabled power management system of claim 2, wherein the motion detection module and the second motion detection module comprise a plurality of sensors in communication with each of the self-contained receptacle outlet and the second self-contained device, and wherein at least one of the processor of the self-contained receptacle outlet and a second processor of the second self-contained device is configured for analyzing a plurality of signals received from the plurality of sensors and for determining a location of a subject within at least one of the first predefined area and the second predefined area.

4. The communication-enabled power management system of claim 3, wherein the security component comprises at least one sensor detecting an occurrence of an emergency event, and wherein at least one of the processor and the second processor is analyzes a second plurality of signals from the at least one sensor of the security component to determine a relative location of the occurrence of the emergency event within at least one of the first predefined area and the second predefined area.

5. The communication-enabled power management system of claim 4, wherein upon detecting the emergency event, at least one of the processor and the second processor compares the relative location of the emergency event to the location of the subject, and wherein after comparing the relative location of the emergency event to the location of the subject, at least one of the processor and the second processor generates and sends a message to an emergency computing device and adjusts a state of at least one of the self-contained receptacle outlet and the second self-contained device.

6. The communication-enabled power management system of claim 5, wherein the message sent to the emergency computing device comprises a report comprising a visual representation of the first predefined area, the second predefined area, the location of the subject, and the relative location of the emergency event.

7. The communication-enabled power management system of claim 6, wherein the second self-contained device is the self-contained vent that comprises a vent frame coupled to an adjustable grille with at least one integrated opening, an open configuration and a closed configuration, and, wherein if the at least one sensor of the security component detects an environmental condition then the second processor changes a state of the self-contained vent between the open configuration and the closed configuration.

8. The communication-enabled power management system of claim 7, wherein the self-contained receptacle outlet comprises a subset power mode defined by set of input parameters received from the remote controller.

9. The communication-enabled power management system of claim 8, wherein the predictive analytics module of the self-contained receptacle outlet uses at least one algorithm, an occupancy pattern, and a historical power usage data set collected from the power sensor to predict a future power consumption and adjust a power state of the power receptacle based on the subset power mode.

10. A communication-enabled power management system comprising:
a self-contained receptacle outlet comprising:
a housing;
a power receptacle on a front face of the housing;
a power sensor within the housing configured to monitor a plurality of power parameters;
a motion detection module coupled to the housing;
a transceiver within the housing;
a display on the front face of the housing; and
a processor within the housing having a unique identifier; and
a second self-contained device comprising at least one of: (i) a self-contained vent, (ii) a self-contained switch, wherein the self-contained vent and the self-contained switch each comprise a second motion detection module, a security component detection module, a second processor, and a second transceiver; and
a suggestion mode for optimizing efficiency, wherein the suggestion mode utilizes a plurality of sensors on at least one of the self-contained receptacle outlet and the second self-contained device to analyze a plurality of objects within a first predetermined area and a temperature parameter, wherein the suggestion mode compares, using at least one of the processor and the second processor, the temperature parameter to a predetermined threshold and transmits a message to a remote computing device to adjust a position of an object of the plurality of objects to modify the temperature parameter to satisfy the predetermined threshold.

11. The communication-enabled power management system of claim 10, wherein the second self-contained device is the self-contained vent that comprises a vent frame coupled to an adjustable grille with at least one integrated opening, an open configuration and a closed configuration, and, wherein if at least one sensor of the security component detection module detects an environmental condition then a second processor of the second self-contained device changes a state of the self-contained vent between the open configuration and the closed configuration.

12. The communication-enabled power management system of claim 10, wherein the self-contained switch comprises a temperature control module in electrical communication with a thermostat in communication with an HVAC system, and wherein a display on a front face of the self-contained switch comprises a user interface having a temperature indicator based on a plurality of sensors of at least one of the self-contained receptacle outlet and the second self-contained device.

13. The communication-enabled power management system of claim 12, wherein the second processor of the self-contained switch is configured for receiving a change in temperature on the user interface, transmitting the change in temperature to the thermostat, and communicating with a third self-contained device being the self-contained vent to adjust a state of the self-contained vent.

14. The communication-enabled power management system of claim 10, wherein the motion detection module and the second motion detection module comprise a plurality of sensors in communication with each of the self-contained receptacle outlet and the second self-contained device, and wherein at least one of the processor of the self-contained receptacle outlet and the second processor of the second self-contained device is configured for analyzing a plurality of signals received from the plurality of sensors and for determining a location of a subject within at least one of a first predefined area and a second predefined area.

15. The communication-enabled power management system of claim 10, wherein at least one of the processor and a second processor of the second self-contained device analyzes a plurality of signals from at least one sensor of the security component detection module to determine a relative location of an occurrence of an emergency event within at least one of a first predefined area and a second predefined area.

16. The communication-enabled power management system of claim 15, wherein upon detecting the emergency event, at least one of the processor and the second processor compares the relative location of the emergency event to a location of a subject as determined by the motion detection module, and after comparing the relative location of the emergency event to the location of the subject, at least one of the processor and the second processor generates and sends a message to an emergency computing device and adjusts a state of at least one of the self-contained receptacle outlet and the second self-contained device.

17. The communication-enabled power management system of claim 10, wherein the motion detection module and the second motion detection module monitors a current position of a subject within a predetermined area in real-time.

18. The communication-enabled power management system of claim 10, wherein the motion detection module and the second motion detection module communicates with the self-contained vent and a thermostat to adjust a state of the self-contained vent based on a current position of a subject within a predetermined area.

19. A self-contained receptacle outlet comprising:
a housing;
a power receptacle on a front face of the housing;
a power sensor configured to monitor a plurality of power parameters;
a transceiver within the housing;

a switching module coupled to the housing configured to allow a user to selectively control a flow of electrical power to a connected electrical device;

a motion detection module coupled to the housing;

an independent power backup management module coupled to the housing;

a display on the front face of the housing having a user interface on an outward face on the front face of the self-contained receptacle outlet configured to display at least one power parameter of the plurality of power parameters;

a processor coupled configured for:
  monitoring a current position of a subject within a predetermined area in real-time;
  sending a message to a remote computing device, the message comprising a report comprising a visual representation of a predefined area and the current position of the subject;
  communicating with a second self-contained device comprising at least one of: (i) a self-contained vent, (ii) a self-contained switch, (iii) and a thermostat to modify a state of the second self-contained device;
  enabling a power failure mode, wherein if an input power parameter is below a minimum threshold, then activating the independent power backup management module to supply power to the self-contained receptacle outlet.

* * * * *